(12) United States Patent
Swami et al.

(10) Patent No.: US 7,724,750 B2
(45) Date of Patent: May 25, 2010

(54) EXPEDITED DATA TRANSMISSION IN PACKET BASED NETWORK

(75) Inventors: Yogesh Prem Swami, Irving, TX (US); Khiem Le, Coppell, TX (US)

(73) Assignee: Nokia Corporation, Espoo (FI)

( * ) Notice: Subject to any disclaimer, the term of this patent is extended or adjusted under 35 U.S.C. 154(b) by 1232 days.

(21) Appl. No.: 10/866,998

(22) Filed: Jun. 15, 2004

(65) Prior Publication Data
US 2005/0220097 A1 Oct. 6, 2005

Related U.S. Application Data

(60) Provisional application No. 60/558,149, filed on Apr. 1, 2004.

(51) Int. Cl.
H04L 12/28 (2006.01)

(52) U.S. Cl. .................. 370/395.42; 370/412

(58) Field of Classification Search ............... None
See application file for complete search history.

(56) References Cited

U.S. PATENT DOCUMENTS

| | | | |
|---|---|---|---|
| 6,038,216 A * | 3/2000 | Packer | 370/231 |
| 6,134,239 A | 10/2000 | Heinänen et al. | |
| 6,304,578 B1 * | 10/2001 | Fluss | 370/413 |
| 6,744,730 B2 | 6/2004 | Le et al. | |
| 7,274,666 B2 * | 9/2007 | Balakrishnan et al. | 370/232 |
| 2003/0182480 A1 | 9/2003 | Varma et al. | |
| 2004/0122969 A1 | 6/2004 | Ameigeiras et al. | |
| 2004/0196790 A1 * | 10/2004 | Balakrishnan et al. | 370/232 |
| 2008/0040718 A1 * | 2/2008 | Cloonan et al. | 718/102 |
| 2008/0120424 A1 * | 5/2008 | Deshpande | 709/230 |
| 2008/0279213 A1 * | 11/2008 | Tong et al. | 370/458 |

FOREIGN PATENT DOCUMENTS

| | | |
|---|---|---|
| DE | 199 07 085 C1 | 4/2000 |
| WO | WO 03/049481 A1 | 6/2003 |

OTHER PUBLICATIONS

Ferdinand Gramsamer, Optimizing Flow Control for Buffered Switches, Oct. 14, 2002, IEEE, Proceedings, Eleventh International Conference on Computer Communications and Networks, pp. 438-443.*

RFC 2001 "TCP Slow Start, Congestion Avoidance, Fast Retransmit, and Fast Recovery Algorithms", Jan. 1997.

International Search Report for PCT/IB2005/000514 filed Mar. 1, 2005.

Communication issued by the European Patent Office in connection with corresponding European Patent Application No. 05 708 617.4—1249.

* cited by examiner

*Primary Examiner*—Jayanti K Patel
*Assistant Examiner*—Hooman Houshmand
(74) *Attorney, Agent, or Firm*—Alston & Bird LLP

(57) ABSTRACT

An improved scheduling mechanism usable for a data transmission in a packet based network is provided. A plurality of connections is detected, and for each of the connections, a buffer occupancy level is determined. Then, the connections having a smaller buffer occupancy level are prioritized in comparison to the other connections, and packets of the plurality of connections are scheduled on the basis of the result of the prioritizing. The scheduling mechanism is implemented in a network element of the packet based network or in a sender and receiver.

72 Claims, 10 Drawing Sheets

US 7,724,750 B2

EXPEDITED DATA TRANSMISSION IN PACKET BASED NETWORK

REFERENCE TO RELATED APPLICATIONS

This application claims priority of U.S. Provisional Patent Application Ser. No. 60/558,149, filed on Apr. 1, 2004. The subject matter of these earlier filed applications is hereby incorporated by reference.

BACKGROUND OF THE INVENTION

1. Field of the Invention

The present invention is related to a method of transmitting data in a packet based network, and/or to a device for controlling a transmission of data in a packet based network, and/or to a communication network system using a corresponding device, and or to a corresponding computer program product. The following specification is in particular directed to a queuing/scheduling mechanism used in a transmission of packets of data for optimizing transmission performance in communication networks.

2. Description of the Related Prior Art

In the last years, an increasingly extension of data transmission networks, such as the Internet, and communication networks, such as wire based communication networks like the Integrated Services Digital Network (ISDN), or wireless communication networks like cdma2000 (code division multiple access) system, Universal. Mobile Telecommunications System (UMTS), the General Packet Radio System (GPRS), or other wireless communication system, such as the Wireless Local Area Network (WLAN), took place all over the world. Various organizations, for example the $3^{rd}$ Generation Partnership Project (3GPP), the International Telecommunication Union (ITU), $3^{rd}$ Generation Partnership Project 2 (3GPP2), Internet Engineering Task Force (IETF), and the like, are working on standards for telecommunication network and multiple access environments.

In general, the system structure of such a network is on a client/server basis. In case of a communication network, a subscriber's user equipment, such as a mobile station, a mobile phone, a fixed phone, a personal computer (PC), a laptop, a personal digital assistant (PDA) or the like, is connected via respective transceivers and interfaces, such as an air interface, a wired interface or the like, to an access network subsystem. The access network subsystem controls the communication connection to and from the user equipment and is connected via an interface to a corresponding core or backbone network subsystem. The core (or backbone) network subsystem switches the data transmitted via the communication connection to a destination, such as another user equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM, WLAN and the like. Generally, for properly establishing and handling a connection between network elements such as the user equipment and another user terminal, a database, a server, etc., one or more intermediate network elements such as support nodes or service nodes are involved.

TCP/IP (Transmission Control Protocol/Internet Protocol) is a network protocol used on, for example, LANs, WANs and the Internet. With the increasing amount of packet services on wireless systems, the use of TCP on a wireless system increases and in the near future it is believed that a considerable amount of the traffic on a wireless system is based on TCP. Currently a major part of all Internet traffic is based on TCP/IP. In TCP, data is split into what the protocol considers the optimum size chunks to transmit. The chunks are denominated segments and their size must not exceed a maximum constant value (Maximum Segment Size or MSS).

TCP is an end-to-end protocol. Generally, TCP has no advance knowledge of the network characteristics. Thus, it is adapted to adjust the transmission behavior according to the present network conditions. One important feature is the so-called congestion control. Congestion can occur, for example, when data arrives at a network node on a big pipe (fast link) and is to be sent out on a smaller pipe (slower link). Congestion may also occur when multiple input streams arrive at a router or the like whose output capacity is smaller than the total amount of the inputs. In such a case, the incoming data are buffered, for example, in a buffer means of the router or of another network element.

Whenever a segment is transmitted by a server it has to reach a client which acknowledges the transmitted segment. The elapsed time when the server transmits the segment until it receives the corresponding acknowledgment is commonly known as Round Trip Time (RTT). This is shown in FIG. 6 for a segment or packet 1 transmitted from the server to the client and an acknowledgment ACK 1 transmitted from the client to the server. The TCP server holds a variable used to calculate an estimation of a maximum allowed RTT. This variable is called Retransmission Time-Out (RTO). Moreover, the server has a timer that counts the elapsed time since the segment was transmitted. If the corresponding acknowledgment does not arrive at the server before the timer reaches the value of the RTO estimator, the server considers that congestion has occurred in the network and starts congestion avoidance actions.

TCP tries to adapt the transmission rate to the load and capacity of the links of the network. This is done by several mechanisms, like slow start, retransmission timeout, fast retransmission, etc. (see, for example, IETF RFC 2001, "TCP Slow Start, Congestion Avoidance, Fast Retransmit, and Fast Recovery Algorithms", by W. Stevens, January 1997). Fast retransmission and retransmission timeout cause retransmission of TCP/IP packets, when they are lost or delayed more than a dynamic timer RTO. Slow start starts the data transmission slowly and increases the window size gradually in order to adjust the size of the sending window to match the current ability of the network to deliver segments (or packets). Slow start is generally used at the start of a connection, at the expiry of the retransmission timer, and/or after a long passive TCP phase.

In the following, TCP performance in cellular networks is contemplated. As mentioned above, TCP is a transport layer protocol that uses rate of arrival of ACKs to gradually utilize network capacity. In addition, TCP starts with a very low throughput during its slow-start period, which occurs at the start of the connections and sometimes, during the connection. In cellular networks, due to low bandwidth and high bit error rates on the radio interface, the rate at which ACKs are received is extremely slow. This means that a TCP sender will require a long time to reach a reasonable throughput during the slow-start period.

One typical implantation for networks using TCP is to use a so-called first-in first-out (FIFO) algorithm for transmitting TCP data and ACK packets in the network. In cellular networks, due to the low link data rate, the network queues may become large. In such cases, the network behavior caused by the FIFO processing may excessively delay the transmission of the ACK so that a TCP sender is prevented from reaching a sufficient throughput in a reasonable time.

As described above, TCP slow start may occur at the start of the connection and whenever there is a timer timeout. The goal of slow start is to start with a small data rate to make sure that the network can accommodate at least a very little amount of data. This is done in order to avoid network congestion. TCP then relies on the rate of arrival of ACKs to gradually increase its data rate until it reaches a reasonable throughput.

In cellular networks, however, due to small bandwidth and high bit error rate, often the round trip time (RTT) of the connection is large. This means that the rate at which ACKs are received is very slow since after sending a window of data the sending side needs to wait one RTT until it receives any acknowledgement. Due to this, the TCP sender may waste a long time in slow-start mode before it can reach a reasonable throughput. This may be experienced by a user as degraded service experience. It is to be noted that in the network all packets of a connection received by a network node which has to forward the data arrived via the connection are queued in (or enqueued) with all packets/data received from other connections arriving at this network node. This means that the RTT during slow start has a strong component of the queuing delay coming from other connections.

There have been made several attempts for solving the problem of accelerating the data transmission rate of connections. In general, either the intention has been to increase the data rate at the start of the connection or to reduce the RTT of a connection.

With regard to the slow start condition of a connection, in order to reduce the time taken by the slow start on long delay paths, it is tried, for example, to change the window increase algorithm of TCP. One example for this is to use a larger window than one packet at the beginning of slow start, wherein an initial window of maximum 4 packets has been proposed. Another example is defined as packet spacing, e.g. Rate Based Spacing, where the source transmits directly at a large window without overloading the network. A further approach on the network side is to establish many parallel TCP connections for the same transfer, which however is problematic when only a limited transfer capacity is available, and which also increases the overall load of the network.

There has been proposed a scheduling/queuing algorithm called Queue Length based Weighted Fair Queuing (QLWFQ) Algorithm. Generally, by means of a weighted fair queuing algorithm, data to be transmitted by one network node and coming from different sources are priorized in order to ensure that each connection is treated in a fair way, i.e. that data of each connection are transmitted in a reasonable time period. In case of the QLWFQ, the packets are scheduled (allocated to a priority) so that the longest queue gets a higher priority. However, the weighted fair queuing is generally independent of connection level information so that changes in a TCP connection are not considered.

SUMMARY OF THE INVENTION

It is a general purpose of the present invention to provide a new mechanism by means of which an improved forwarding/transmission of packet based data in a communication network is achievable.

In detail, it is an object of the invention to provide an improved mechanism for queuing/scheduling data for an expedited transmission via a packet based communication network.

For solving this object, according to one aspect provided in the present specification, there is proposed, for example, a method of forwarding data in a packet based network, the method comprising the steps of detecting a plurality of connections, determining a buffer occupancy level for each of the plurality of connections, prioritizing the connections having a smaller buffer occupancy level in comparison to the other connections, and scheduling packets of the plurality of connections on the basis of the result of the prioritizing step.

Furthermore, according to one aspect provided in the present specification, there is proposed, for example, a device for controlling forwarding of data in a packet based network, the device comprising detecting means for detecting a plurality of connections, determining means for determining a buffer occupancy level of each of the plurality of connections, prioritizing means for prioritizing the connections having a smaller buffer occupancy level in comparison to the other connections, and scheduling means for scheduling packets of the plurality of connections on the basis of the result obtained by the prioritizing means.

Moreover, according to one aspect provided in the present specification, there is proposed, for example, a communication network system in which a packet based data transmission is executable, the system comprising at least one network node usable for controlling the data transmission, wherein the network node comprises the device specified above.

Finally, according to one aspect provided in the present specification, there is proposed, for example, a computer program product comprising processor implementable instructions for controlling a processor to execute the method specified above.

According to further refinements, as defined in the respective dependent claims, the proposed solution may comprise additionally, but not exclusively, one or more of the following features:

- identifying a packet transmitted on a connection of a specific type;
- in the determination of the buffer occupancy level, the buffer occupancy level in a buffer of a network element is determined;
- the prioritizing may comprise an allocation of a priority indication to each of the plurality of connections on the basis of the determined buffer occupancy level, and a processing of the priority indications of each of the plurality of connections for scheduling the packets;
- in the allocation of a priority indication, a higher priority level may be allocated to a connection having a smaller buffer occupancy level than the other connections;
- the priority indication allocated to each of the plurality of connections may be updated when a new packet is received via at least one of the plurality of connections;
- in the determination of the buffer occupancy level, the buffer occupancy of a respective connection may be computed by comparing the number of bytes of one of the plurality of connections with the number of bytes of all of the plurality of connections;
- the computation of the buffer occupancy may be based on an equation $$\text{occupancy}(i) = \frac{\text{bytes\_enqueued\_for\_}(i)}{\sum_{j=1}^{N} \text{bytes\_enqueued\_for\_}(j)};$$

where i indicates the respective connection, occupancy(i) indicates the buffer occupancy level of the respective connection, bytes_enqueued_for indicates the number of bytes of a respective connection enqueued in the buffer, and N indicates the total number of the plurality of connections;

the determined buffer occupancy level of each of the plurality of connections may be compared with a predetermined parameter for deciding on the kind of the allocation of the priority indication;

the comparison of the determined buffer occupancy level of each of the plurality of connections with a predetermined parameter may be based on a relation $$\text{occupancy}(i) < \frac{1}{N} - \delta;$$

where i indicates the respective connection, occupancy(i) indicates the buffer occupancy level of the respective connection, N indicates the total number of the plurality of connections, and δ indicates a configurable parameter satisfying a relation $$0 < \delta < \frac{1}{N};$$

the allocation of the priority indication may comprise an assignment of a probability value which defines a transmission probability of a packet of the respective connection to each of the plurality of connections on the basis of the buffer occupancy level;

the assignment of a probability value to each of the plurality of connections on the basis of the buffer occupancy level may be based on an equation $$\text{sched\_priority}(i) = \frac{1 - \text{occupancy}(i)}{N - 1};$$

where i indicates the respective connection, sched_priority(i) indicates the probability value which defines a transmission probability of a packet of the respective connection, occupancy(i) indicates the buffer occupancy level of the respective connection, and N indicates the total number of the plurality of connections;

the processing of the priority indications of each of the plurality of connections may comprise an ordering of the connections in a ranking according to the probability values of each of the plurality of connections;

the scheduling of the data packets of each of the plurality of connections may comprises a generation of a random number, a selection of the connection of the plurality of connections on basis of a comparison between the rankings of each of the plurality of connections and the random number, and a scheduling of a packet of the selected connection for transmitting it;

in the selection of the connection a connection may be selected whose ranking is greater than the random number and closest to the random number;

the scheduling the data packets may be repeated;

the determination of the buffer occupancy level may comprise a computation of the buffer occupancy of a respective connection by summing up a total data amount of all packets present for a respective connection, a comparison of the total data amount of the respective connection with unique predetermined threshold values defined for a plurality of queues of the buffer, and an assignment of the respective connection to one of the queues on the basis of the comparing step, wherein each of the queues may be associated with a unique priority level;

the comparison of the total data amount of the respective connection with unique predetermined data amount threshold values defined for a plurality of queues of the buffer may be based on a relation $$bth(q) \leq B < bth(q+1);$$

where B indicates the total data amount of the respective connection, q indicates a respective queue of the plurality of queues, and bth indicates the unique predetermined data amount threshold value for a queue;

in the assignment of the respective connection to one of the queues the respective connection may be assigned to the queue whose unique predetermined data amount threshold value is smaller or equal than the total data amount of the respective connection;

in the allocation of a priority indication to each of the plurality of connections the priority value of the queue to which the respective connection is assigned may be allocated as the priority indication of the respective connection;

the processing of the priority indications of each of the plurality of connections may comprise an ordering of the connections in a ranking according to the priority value of the queues.

the scheduling of the packets may comprise a selection of the connection having the highest priority indication, and a scheduling of a packet of the selected connection for transmitting it;

in a case where two or more of the plurality of connections are allocated to the same priority indication, the scheduling of the packets may be based on a heuristic algorithm for at least the two or more of the plurality of connections;

the mechanism may be executed in case of a slow start condition of at least one of the plurality of connections;

the connections may comprise at least one connection of a TCP type.

Moreover, according to further refinements, as defined in respective dependent claims, the proposed solution may comprise additionally, but not exclusively, one or more of the following features:

the prioritizing of the connections may comprises an emulation of a link speed for each of the plurality of connections, wherein the scheduling of packets is based on the link speed emulation;

a link speed emulation parameter may be determined on the basis of a maximum link speed of a respective connection;

a link speed emulation parameter may be determined on the basis of a round trip time for a respective connection;

a determination may be performed on whether or not a current packet is the first packet in a queue of a respective connection;

in the case that the current packet is not the first packet in a queue, a scheduling time for the transmission of a preceding packet may be determined, a scheduling time for the current packet may be computed on the basis of the scheduling time of the preceding packet, a packet size of the preceding packet and the link speed emulation parameter, wherein the step of scheduling the packet is based on the scheduling time for the current packet, and in the case that the current packet is the first packet in a queue, a transmission time of the first packet may be delayed by a fixed amount of time;

alternatively, wherein in the case that the current packet is not the first packet in a queue a scheduling time for the transmission of a preceding packet may be determine, a scheduling time for the current packet may be computed on the basis of the scheduling time of the preceding packet, a packet size of the current packet and the link speed emulation parameter, wherein the step of scheduling the packet is based on the scheduling time for the current packet, and in the case that in the case that the current packet is the first packet in a queue a scheduling time for a transmission of a virtual preceding packet may be set at zero, and a scheduling time for the current packet may be computed on the basis of the set scheduling time of the virtual preceding packet, a packet size of the current packet and the link speed emulation parameter, wherein the step of scheduling the packet is based on the scheduling time for the current packet;

it may be checked whether a sender node is in a congestion avoidance phase, and if the sender node is in the congestion avoidancephase, the emulation of the link speed may be disabled for each of the plurality of connections, wherein the scheduling of packets is based on a default scheduling mechanism;

it may be checked whether or not any one of the plurality of connections comprises a sender node and/or a receiver node being not capable of performing the emulation of a link speed for each of the plurality of connections, and if there is one sender node and/or receiver node not being capable of performing the emulation of a link speed for each of the plurality of connections, the emulation of a link speed may be disabled for each of the plurality of connections for all sender nodes and receiver nodes, wherein the scheduling of packets is based on a default scheduling mechanism.

By virtue of the proposed solutions, the following advantages can be achieved:

One of the proposed mechanisms requires no change to TCP sender or receiver. On the other hand, the other one of the proposed mechanisms requires no change in the existing network infrastructure.

The user experience is improved since the slow start period is reduced. At the start of a connection, the buffer occupancy of a slow starting connection is often much smaller than that of other connections. By giving higher priority to those connections which have lower buffer occupancy (i.e., by scheduling packets in slow start ahead of other connections) the RTT period can be reduced. On the other hand, once the connection reaches a buffer occupancy at par with other connections, each connection gets the same share of resources. This is very useful for cellular networks where the RTT is very large and slow starting connections spend a long time before getting a fair share of bandwidth.

The proposed mechanism is able to follow changes in a connection level. This means that, for example, the priority of a TCP connection changes as the connection proceeds, i.e. when a greater part of the buffer is required due to a higher data amount of that connection.

The proposed mechanism is applicable in a plurality of applications. For example, the mechanism is effective in connection with terminals which support "rich call" applications ("rich call" describes the combination of different media types like speech, video and multimedia messaging in one call) and multiple concurrent applications. The mechanism is also applicable in connection with different network access technologies, such as HSDPA (High Speed Downlink Packet Access) and GPRS (General Packet Radio Service). Additionally, it is implementable in various network node types, like core network nodes such as SGSN (Serving GPRS Support Node), IP routers, radio access network elements and the like.

By means of the proposed mechanisms, the data throughput in congestion avoidance at the network side and/or the server (sender) side is improved.

The above and still further objects, features and advantages of the invention will become more apparent upon referring to the description and the accompanying drawings.

DESCRIPTION OF PREFERRED EMBODIMENTS

In the following preferred embodiments of the invention are described in detail with reference to the drawings. It is to be noted that the invention is not confined to the examples presented herein below but may enclose also other examples as mentioned later.

First Embodiment

According to the first embodiment, in general, in the proposed transmission control mechanism, a preferential treatment is given to flows/connections that transmit a smaller amount of data in comparison to other flows/connections. This is in particular effective in connection with a network node of a cellular network close to the access link, such as a SGSN in case of GPRS or the like, since at this place in the end-to-end transmission path a "bottleneck" may be established due to the fact that most of the transmission buffering takes place there. In particular, an efficient queuing/scheduling algorithm is used that can expedite, for example but not exclusively, the slow start of a connection. This is based on the observation that at the start of the connection the buffer occupancy of a slow starting connection is much smaller than that of other connections. Therefore, by giving higher priority (i.e., by scheduling packets in slow start ahead of other connections) to those connections, which have lower buffer occupancy, the round trip time (RTT) is reduced and the time period until a reasonable throughput is achieved for the respective connection is shortened. Once the connection reaches a buffer occupancy level at par with other connections, each connection gets the same share of resources.

Figure 1:
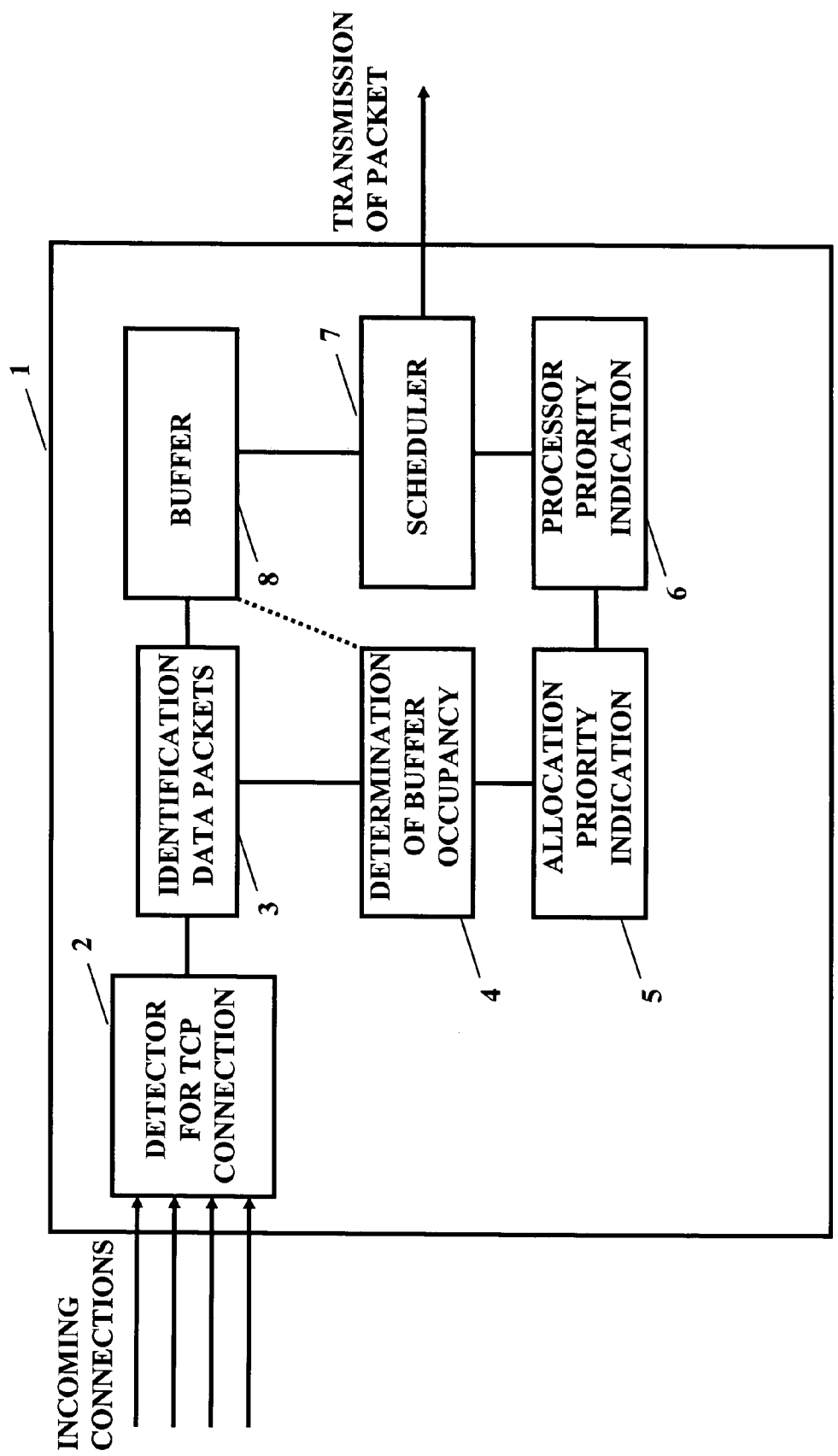
FIG. 1 shows a device for controlling a data transmission according to a first embodiment of the invention.

In FIG. 1, an example for a device 1 implementing such a scheduling mechanism is shown.

The device 1 may be part of a network node, for example, of the access network subsystem or of the core network subsystem, like a wireless network node (e.g. SGSN) or a router. Even though in FIG. 1 separate means for illustrating the different functions of the mechanism are shown, it is to be noted that these functions can be implemented by software and executed by one or more parts of the network node, such as by a central processing unit (CPU) and memory means thereof. The network nodes in which the proposed mechanism is implementable may comprise for executing their respective functions several means which are required for control and/or communication functionality. Such means are, for example, a processor unit for executing instructions and processing data (for example, transmission content and signaling related data), memory means for storing instructions and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user and/or an operator (e.g. a screen, a keyboard and the like), and interface means for establishing a communication connection under the control of the processor unit (e.g. wired and wireless interface means, an antenna, and the like).

It is to be noted that in the following the terms "node", "router" or "network node" concern all one and the same network element implementing the proposed scheduling mechanism.

According to FIG. 1, the device 1 comprises a detector (detecting means) 2 for detecting connections of a specific type from a plurality of incoming connections. The detector is adapted to detect, for example, TCP connections. Furthermore, the device 1 comprises identifying means 3 for identifying data packets of flows incoming via a specific TCP connection. Such an identification of a flow may be achieved on the basis of port numbers, source and destination IP addresses or Ipv6 flow labels, for example. The data packets are forwarded to a buffer 8 buffering the packets of each connection for a subsequent transmission (to be described later). In a determining means 4, the buffer occupancy of each TCP connection, i.e. the length of the flow specific buffers contained in the buffer 8 for each of the TCP connections, is determined and a corresponding buffer occupancy level is defined on this basis. An allocating means 5 uses the buffer occupancy level of the TCP connection for allocating a priority indication to the TCP connection. This is done in a manner that a smaller buffer occupancy level leads to a higher priority indication, while a greater buffer occupancy level leads to a lower priority indication for the respective connections. In a processor (processing means) 6, the allocated priority indications for each of the connections are used for a processing. In this processing, a ranking for the connections is generated which is used for deciding on which of the connections is preferred for a transmission of the data packets thereof buffered in the queues. In a scheduler (scheduling means) 7 a scheduling processing is performed for scheduling (or enqueuing) the data packets stored in the buffer 8 on the basis of the priority indication allocated to the TCP connections. In other words, the scheduler 7 selects a respective TCP connection on the basis of the priority indications and transmits a predefined amount of data of the selected TCP connection from the buffer to a destination, such as another network node or a terminal unit.

Preferably, the priority indication (and thus the ranking) of the TCP connections is only changed (or re-computed) when a new data packet is received by the network node (and thus the device 1) via one of the detected TCP connections. Furthermore, when a new TCP connection is established to or via the network node, the device 1 is also acting for enqueing this new connection in the already existing ones.

Next, a first example for a scheduling mechanism performed by the device 1 is described with reference to a flow chart according to FIGS. 2 and 3.

When the scheduling mechanism is started in step S10, TCP connections to the network node/router are detected in step S20. In step S30, data packets incoming via a respective TCP connection are identified as belonging to this connections and stored in the flow specific buffer 8 of the network node.

Then, in step S40, the buffer occupancy level of the respective TCP connections is determined. In other words, the amount of data of each connection stored in the buffer and waiting to be enqueued is calculated. According to the present example, when the node receives a data packet via a respective TCP connection, for example connection i, the buffer occupancy of that connection is computed, for example, by finding out the fraction of buffer space this connection is using as follows $$\text{occupancy}(i) = \frac{\text{bytes\_enqueued\_for\_}(i)}{\sum_{j=1}^{N} \text{bytes\_enqueued\_for\_}(j)};$$

where i indicates a respective TCP connection, occupancy(i) indicates the buffer occupancy level of the connection i, "bytes_enqueued_for" indicates the number of bytes of a respective connection enqueued in the buffer 8, and N indicates the total number of the plurality of TCP connections arriving at the network node with a non-zero buffer occupancy.

In a subsequent step S50, it is decided whether the buffer occupancies of the connections arriving at the node are so different that a special scheduling algorithm is to be executed or not. This is based on comparing the occupancy level of the respective connection I with a predetermined parameter δ in the form of a relation $$\text{occupancy}(i) < \frac{1}{N} - \delta;$$

where δ is satisfying the relation $$0 < \delta < \frac{1}{N}$$

for any of the connections (i.e. for any i).

Here δ is a configurable parameter by means of which it can be considered that if all of the connections have approximately the same occupancy level then there is no need for preferential treatment. The parameter δ can be defined, for example, during the operation of the network element or at the initialization period thereof. The selection of a specific value of δ may consider the network capability, the transmission link capability (size of the transmission pipe) of the respective network node, and the like. For example, when the capability of the network or the network node is quite high, greater differences between the buffer occupancies of the respective connections may be allowable.

When the decision in step S50 is NO, i.e. the connections have approximately the same occupancy level, step S60 follows in which an alternative or native scheduling algorithm is used for scheduling the data packets of the connections. Preferably, this alternative scheduling algorithm may use, for example, a FIFO (First In, First Out) scheduling. It is to be noted that the algorithm is preferably executed at the time of a connection setup. Once the connection has entered the equal priority state, the above described mechanism may be stopped.

On the other hand, when the decision in step S50 is YES, step S70 follows.

On the basis of the buffer occupancy level of each connection, a priority indication for each connection i is determined. In this example, in step S70, a probability value indicating a probability of sending a packet from any of the N connections is computed for each connection i by using an equation $$\text{sched\_priority}(i) = \frac{1 - \text{occupancy}(i)}{N - 1}.$$

The parameter sched_priority is the probability of sending a packet of the connection i. In step S80, the priority indication of each connection is processed by using the probability value sched_priority of a respective connection. In detail, the respective connections are pre-ordered with regard to the probability value, starting with the connection having the highest probability value (i.e. the connection having the smallest buffer occupancy level) and ending with the connection having the lowest probability value (i.e. the connection having the highest buffer occupancy level). Then, in a following step S90, the connections are ordered in a probability ranking beginning with the connection having the highest probability value. The next connection in the ranking is the connection being placed in the second place of the pre-ordering in step S80, wherein a priority indication thereof is calculated by adding the probability value of this connection (the second connection), and that of the connections before (here only the first connection). Thus, the last connection ordered in the ranking in step S90 has a priority indication of 1,0.

For better understanding the functions of steps S70 to S90, a concrete example is given herein below. Assuming there are three TCP connections 1, 2, 3 arriving at the node. According to the buffer occupancy of each of these connections, it is determined that the respective probability values sched_priority are 0.33 for connection 1, 0.2 for connection 2 and 0.47 for connection 3. Then, the connections are ordered in a ranking as connection 3 (0.47), connection 1 (0.8), and connection 2 (1.0). It is to be noted that the numbers in bracket show the probability range from a higher priority connection, i.e. they define what the cumulative probability of a given priority level is. This means, for example, that if the highest probability for rank-1 (connection 1 in the case described above) was 0.47 and the occupancy sched priority for rank-2 (connection 3 in the case described above) was 0.33, then the number in the brackets for connection 1 is 0.47+0.33=0.80. Similarly, for rank-3, the number in the brackets is 0.8+0.2. In other words, the number in the brackets gives the range from 0 to 1 for random numbers that can be used for scheduling. If the random number is 0.9, for example, it can be recognized to lying between 0.8 and 1.0 so that it is determined that rank-3 is to be scheduled. If the random number, as another case, would be 0.4, the rank-1 connection is to be scheduled.

When the data packets in the buffer 8 are to be scheduled for transmission, in step S100, first a random number between 0 and 1 is generated by a random number generator (not shown). This is done, for example, in the scheduler 7 according to FIG. 1. Then, in step S110, the random number generated is compared with the probability ranking of the connections, i.e. the priority indications thereof, and one of the connections is selected on the basis of this comparison. For example, the selection is based on a result that the ranking of the connection is greater than the random number and closest to the random number. However, also another criteria is possible, such as just being smaller than the random number, or the like.

Referring to the above concrete example, assuming that the random number generated is 0.7, which lies between 0.47 (connection 3) and 0.8 (connection 1), the node schedules a data packet from connection 1.

When the connection (i.e. the data packet) is selected, the packet is transmitted from the buffer to the respective destination indicated by the TCP connection (step S120).

The scheduling mechanism is continued in the network node on the basis of the calculation effected in steps S70 to S90. In detail, in step S130, it is checked whether or not data packets are present in the buffer. If no packets are present anymore, the scheduling mechanism is restarted, i.e. the arrival of new packets is awaited (step S140).

On the other hand, when packets are present in the buffer 8, step S150 is executed in which it is checked whether a new packet has been arrived for one of the TCP connections. If no new packet is received at the network node, the processing is repeated from step S100. On the other hand, if at least one new packet is received which belongs to one of the TCP connections, the processing is repeated from step S30 onwards (step S160).

According to the steps S130 and S150, the node continues scheduling based on the calculation of the current priority indication (ranking) which means that the ranking of each connection is unchanged after the packets are sent out. The ranking of the connections is changed only at the time new packets arrive at the node. Furthermore, due to randomisation of each connection in steps S100 and S110, none of the connections is starved. In addition, the ranking of a connection does not change after sending the packet. This means that as the packets are being sent, the connection does not keep getting higher priority. It is to be noted that since rankings are done only at the time when packets arrive, there is relatively smaller burden on the node to compute and reorder packets.

Preferably, when all packets buffered for one connection are already sent out, this TCP connection is cancelled from the ranking established in step S90 in order to not constrain the transmission of packets of the other connections still having packets to be sent. The corresponding determination of the zero buffer occupancy of such a connection may be executed in connection with step S130, for example, or in a separate step (not shown). This could also be based on an expiry of a timer which indicates that a connection has a zero buffer occupancy for a predetermined period of time and could thus be disabled.

Figure 2:
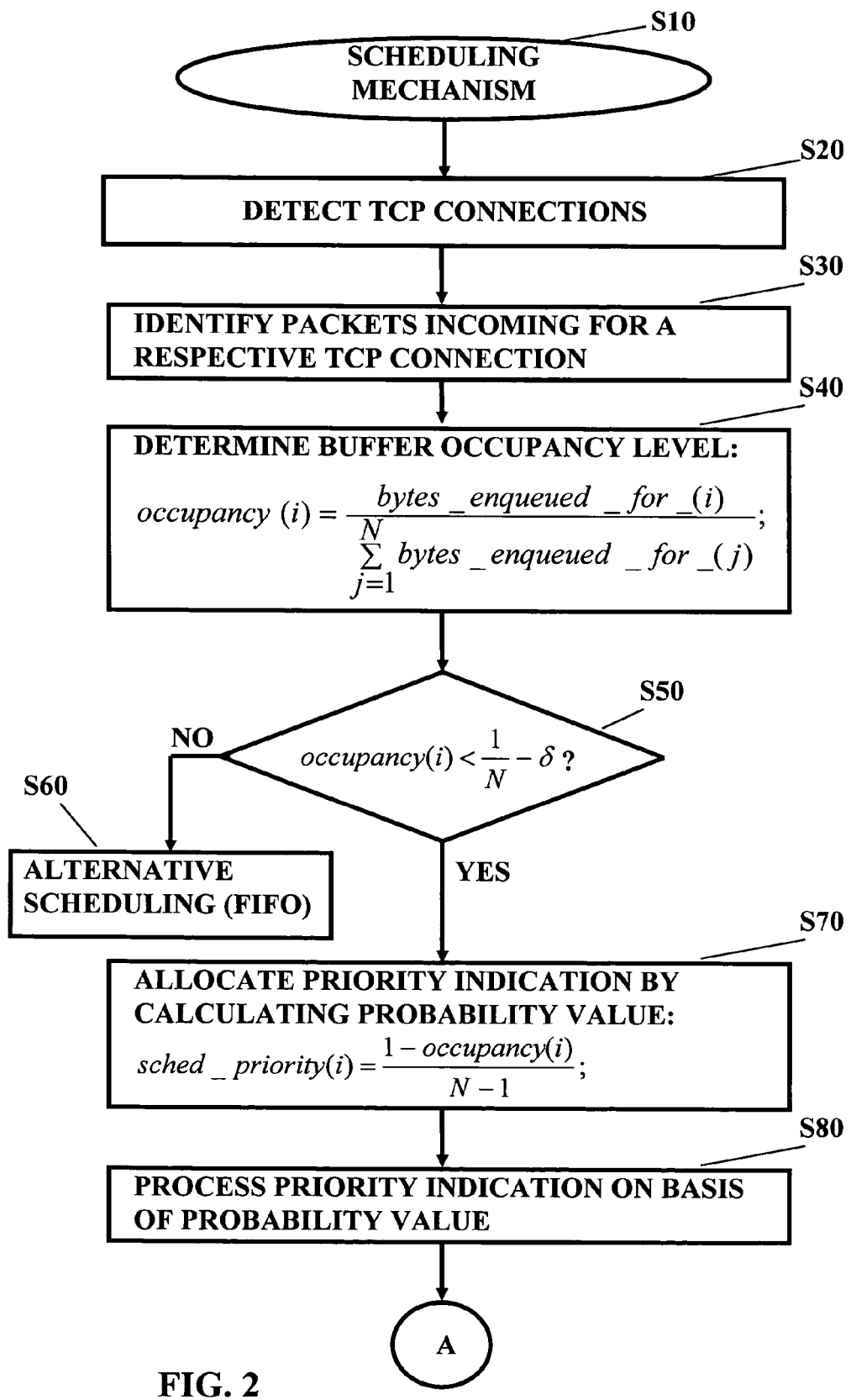
FIGS. 2 and 3 show a flow chart illustrating a scheduling mechanism according to one example of the first embodiment of the invention.
Figure 3:
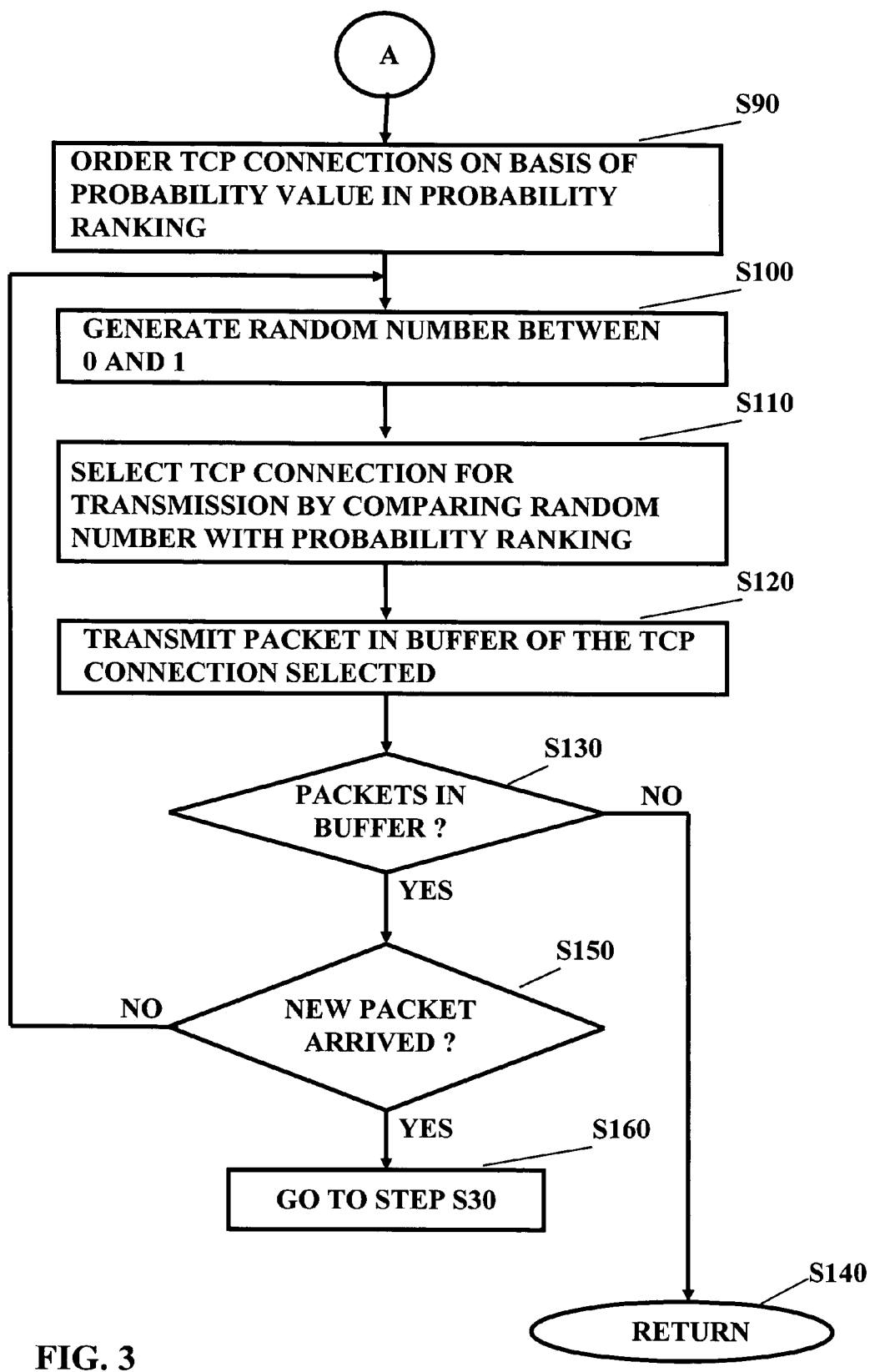

The scheduling mechanism according to FIGS. 2 and 3 is advantageous in that the slow started connection is expedited fast.

Next, a further example of a scheduling mechanism according to the first embodiment is described with reference to the flow chart according to FIGS. 4 and 5.

After starting the scheduling mechanism according to this example in step S210, a detecting step S220 and an identifying step S230 are executed which correspond to steps S20 and S30 according to FIG. 2 and are thus not described in detail herein below.

In step S240, the buffer occupancy levels of the TCP connections are determined. In other words, the total amount of data of each connection stored in the buffer 8 and waiting to be enqueued is calculated. According to the present example, when the node receives a data packet belonging to a respective TCP connection, the total number of bytes of the respective connection is calculated.

According to the present example, the network node is prepared by keeping (virtual) queues j (j=1, 2, 3, ..., M−1, M) for grouping the buffer space of the buffer 8. Assigned to each queue there is defined a unique predetermined priority value $P(j)$ wherein the queue j has a higher priority value than the queue j+1. Furthermore, a unique predefined byte-threshold value $bth(j)$ is associated with each queue, where $bth(j)$ is smaller than $bth(j+1)$. The threshold value bth is used for a comparison with the total data amount of the respective connections arriving at the network node and is used for an assignment of a connection to one of the queues 1 to M.

According to this, in step S250, the total data amount calculated in step S240 is compared with the unique predefined byte-threshold values bth of the network node. Then, in step S260, one of the queues is assigned to the connection on the basis of a relation $$bth(j) \leq B < bth(j+1);$$

where B is the calculated total number of bytes of the respective connection in the network node. The respective connection is assigned to that queue whose threshold value is smaller or equal to the total data amount B, i.e. to queue j.

When the assignment of the respective connection to one of the queues is effected, in step S270, the unique priority value of this queue is allocated to the connection as the priority indication thereof. This means, according to the assignment of bth(j) for B, the priority indication for that connection has the value of P(j).

In step S280, the TCP connections are ordered in a ranking on the basis of the allocated priority indications.

Then, in step S290, it is checked whether two or more connections are allocated to the same priority indication, i.e. assigned to the same queue. If this is the case (YES at step S290), step S300 is executed where an alternative scheduling algorithm is chosen for the scheduling of the data packets of at least those connections having the same priority indication. This alternative scheduling mechanism is based, for example, on an heuristic scheduling algorithm such as FIFO queuing.

On the other hand, when the decision in step S290 is NO (the connections have different priority indications), step S310 is executed where the TCP connection having the highest priority indication is selected first for a transmission of data packets thereof. On the basis of this selection, a data packet of the selected TCP connection is chosen from the buffer 8 and scheduled for the transmission to the destination indicated by the respective TCP connection (step S320).

Then, in step S330, it is checked whether further data packets are waiting to be scheduled in the buffer 8. If no packets are present anymore, the scheduling mechanism is restarted, i.e. the arrival of new packets is awaited (step S350).

On the other hand, when packets are present in the buffer 8, step S340 is executed in which the processing is repeated from step S240 onwards.

Preferably, when all packets buffered for one connection are already sent out, this TCP connection is cancelled from the ranking established in step S280 in order to not constrain the transmission of packets of the other connections still having packets to be sent. The corresponding determination of the zero buffer occupancy of such a connection may be executed in connection with step S330, for example, or in a separate step (not shown). This could also be based on an expiry of a timer which indicates that a connection has a zero buffer occupancy for a predetermined period of time and could thus be disabled.

Figure 4:
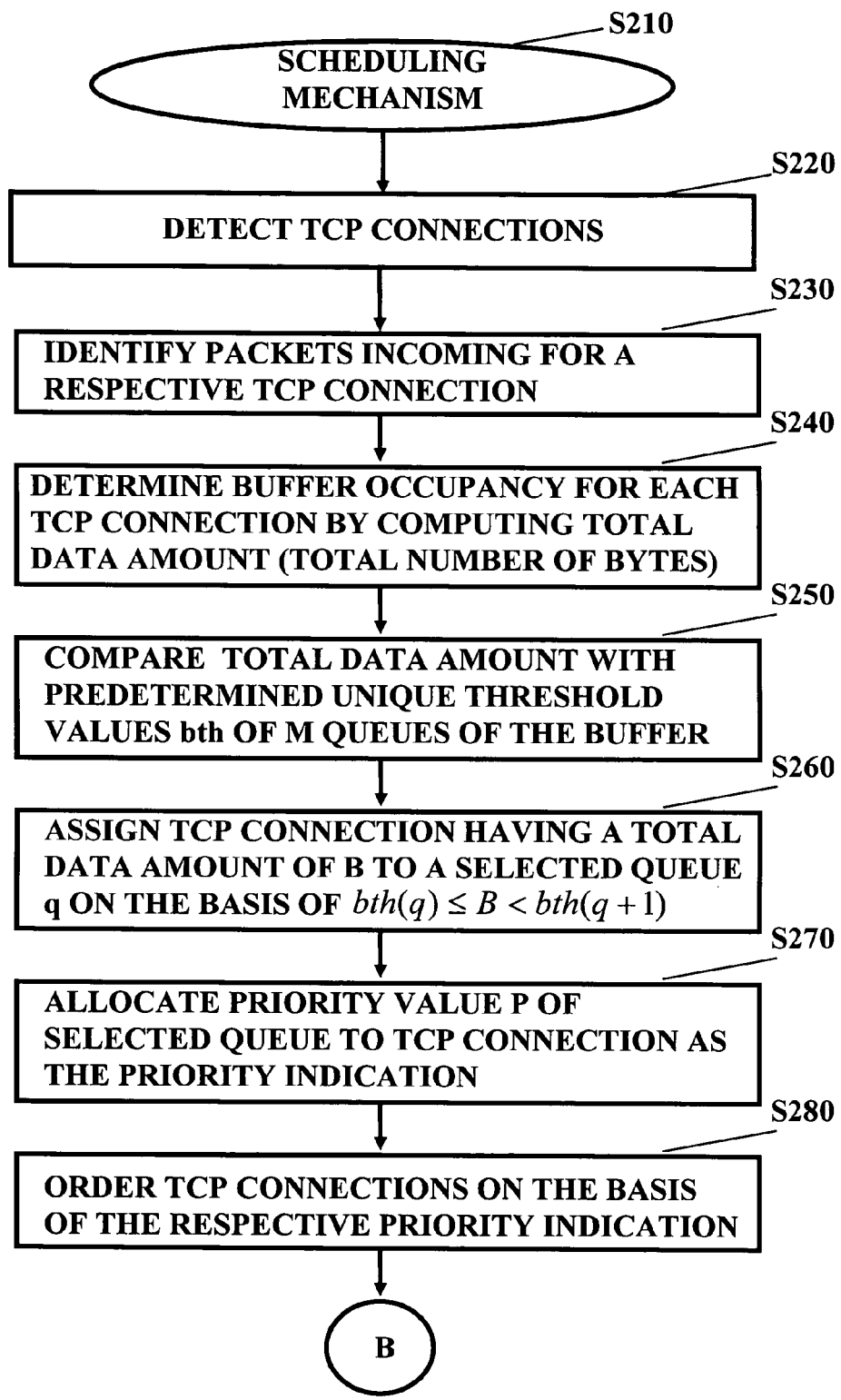
FIGS. 4 and 5 show a flow chart illustrating a scheduling mechanism according to another example of the first embodiment of the invention.
Figure 5:
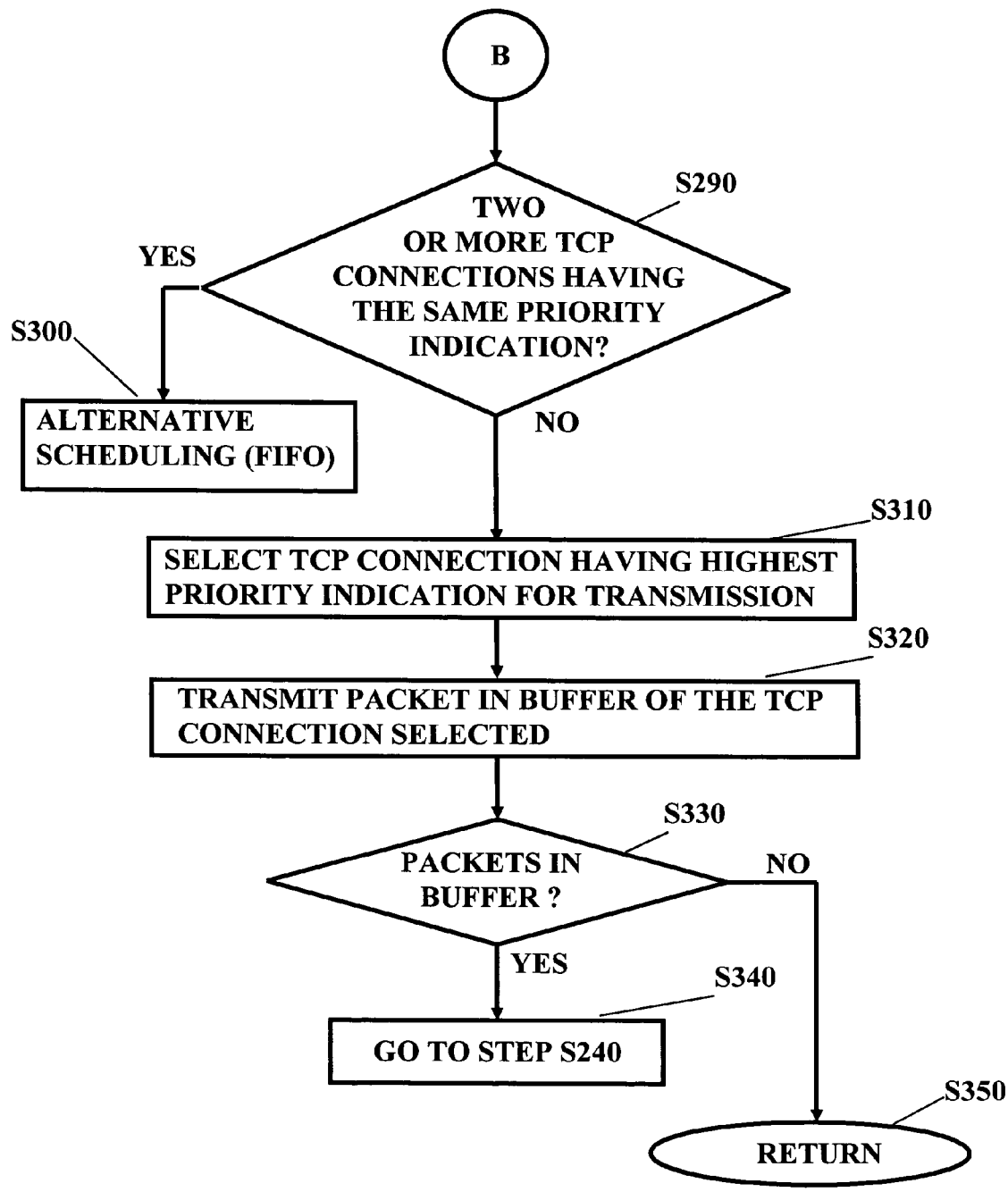
Figure 6:
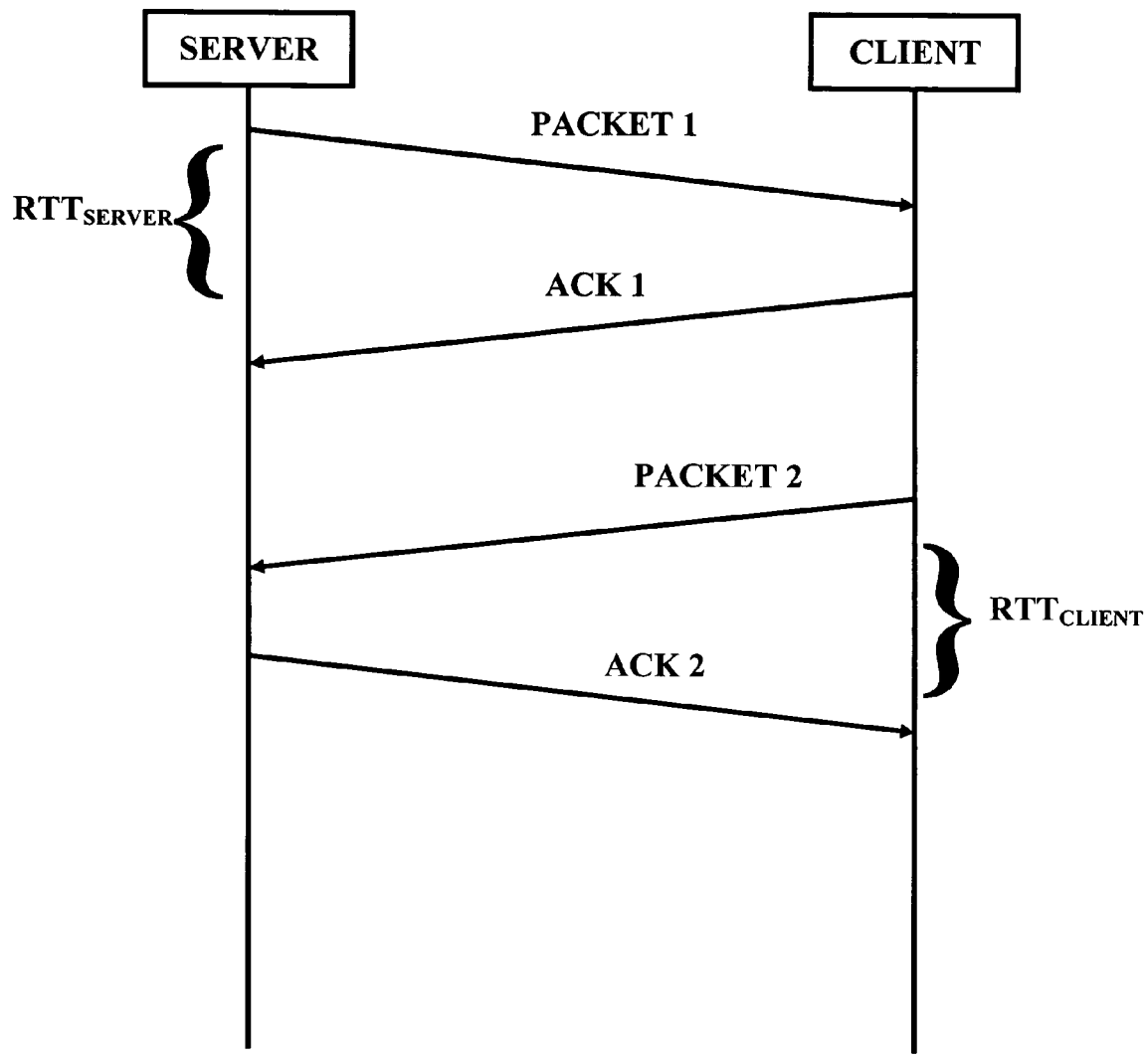
FIG. 6 shows a diagram for illustrating round trip time (RTT)

The scheduling mechanism according to the example of FIGS. 4 and 5 is advantageous in that it does not involve a high computation load which is very desirable by high-speed routers.

As mentioned above, the scheduling mechanism according to the example of FIGS. 2 and 3 is computationally more expensive, but it expedites the slow started connection much faster than the scheduling mechanism according to the example of FIGS. 4 and 5 which is advantageous in that it is computationally less expensive but less efficient in comparison to the first scheduling mechanism.

Thus, as a further alternative for implementing the proposed scheduling mechanisms in a network node, for example, the scheduling mechanism defined in connection with FIGS. 2 and 3 can be combined with the scheduling mechanism defined in connection with FIGS. 4 and 5 in such a way that a selection between the two scheduling mechanisms is performed. Such a selection may be based, for example, on the number of TCP connections at the network node. When this number of TCP connections is smaller than a predetermined threshold value, for example, the scheduling mechanism defined in connection with FIGS. 4 and 5 is executed, and when the number of TCP connections is greater than a predetermined threshold value, for example, the scheduling mechanism defined in connection with FIGS. 2 and 3 is executed, or vice versa. A corresponding selection step can be introduced, for example, after the identification of the data packets (steps S30 and S230, respectively).

It is to be noted that as a further advantage of the first embodiment described above, at least implicitly, TCP ACK packets are prioritized when they are belonging to a slow starting connection. For expediting the slow start, the transmission of the ACK packets may be of importance.

The scheduling mechanisms defined above are preferably implemented in SGSN or any IP router. The schemes can work along with Weighted Fair Queuing (WFQ) techniques, but they can also work in conjunction with other queuing disciplines.

Second Embodiment

Next, a further embodiment of the present invention will be described with reference to FIGS. 7 to 10.

In contrast to the first embodiment where the increase the throughput is achieved by using a weighted fair queuing (WFQ) mechanism in a network node being part of the network infrastructure (in particular for expediting slow start), according to the second embodiment, a mechanism is described which enables a prioritised scheduling at a TCP sender, such as a mobile station, a server and the like. By means of this, the dependency on a network implementation is avoided.

Usually, at the TCP sender side, the sender (or server) recognizes a relatively high-speed link, at least in comparison to a cellular link bottleneck like a network node (e.g. the SGSN) where most transmission buffering takes place. Therefore, on the sender side, usually no transmission buffering is performed (however, it is to be noted that a copy of the transmitted data/packets may be kept for possible retransmission). Conventionally, since there is no packet in the transmission buffer to preempt, a prioritised scheduling is not performed.

According to this embodiment, in general, the server emulates the link speed by delaying each packet by an amount based on [packet size/link speed] before transmitting it. With such a link speed emulation (LSE), a transmission buffer is established at the server side so that a prioritised scheduling is possible.

It is to be noted that for the implementation of the scheduling mechanism according to the second embodiment, it is necessary that at least one network node of the involved transmission network infrastructure, such as a network node where transmission buffering of data to be transmitted via the network, like a SGSN in case of a GPRS based network infrastructure, is provided with a per mobile station (MS) buffer.

Figure 7:
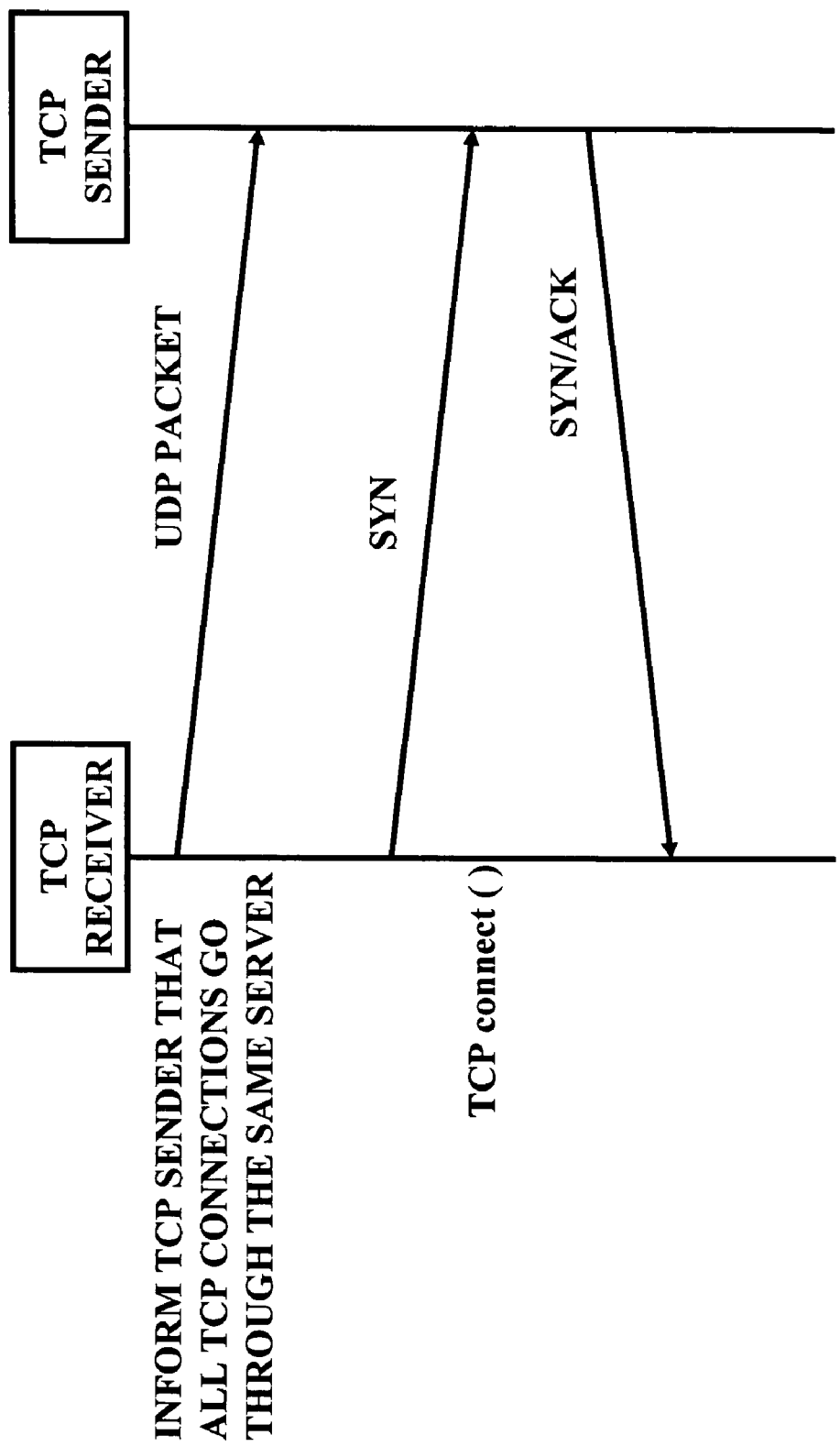
FIG. 7 shows a signaling diagram.
Figure 8:
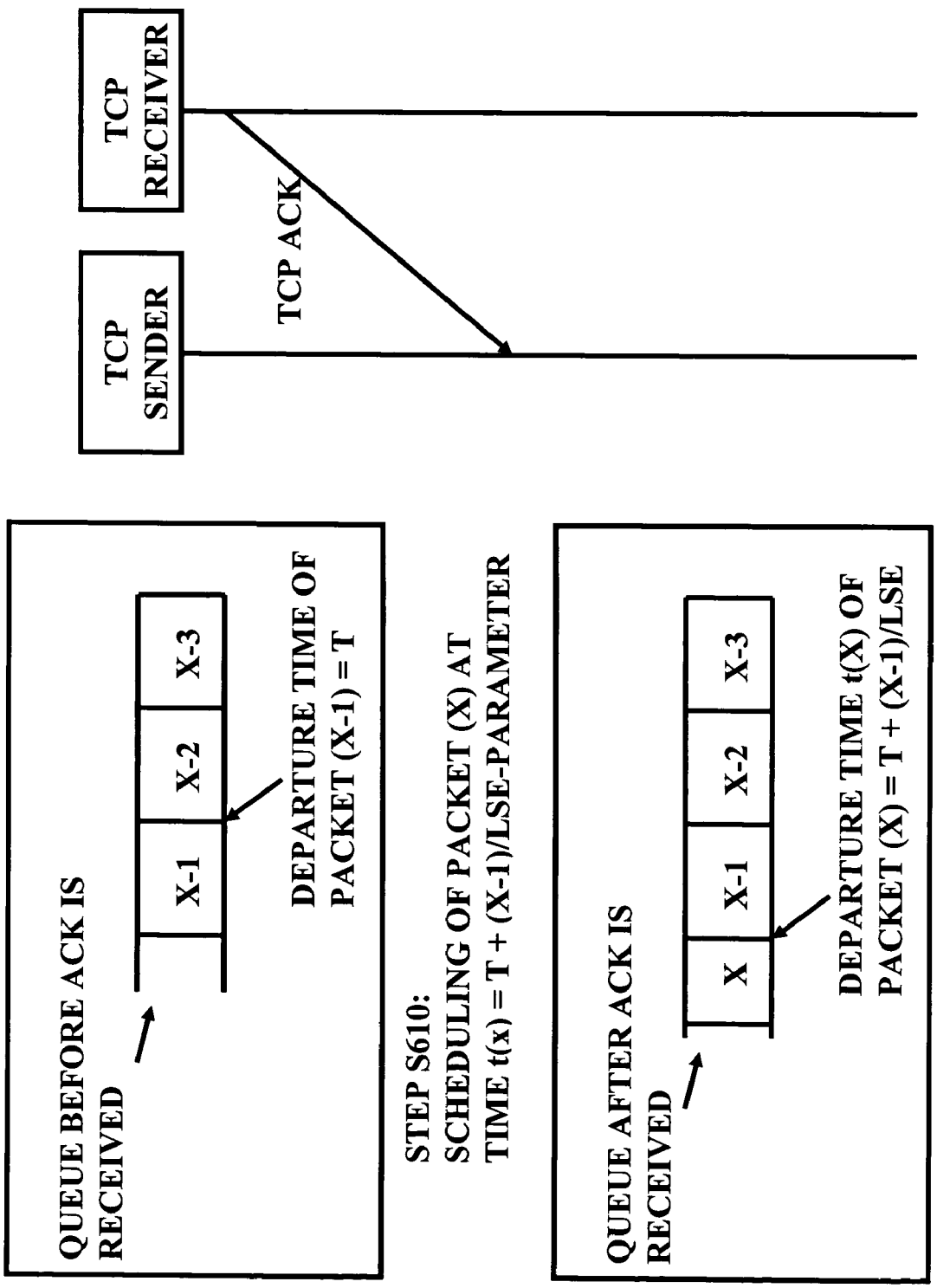
FIG. 8 shows a diagram illustrating a model of a scheduling mechanism according to one example of a second embodiment.
Figure 9:
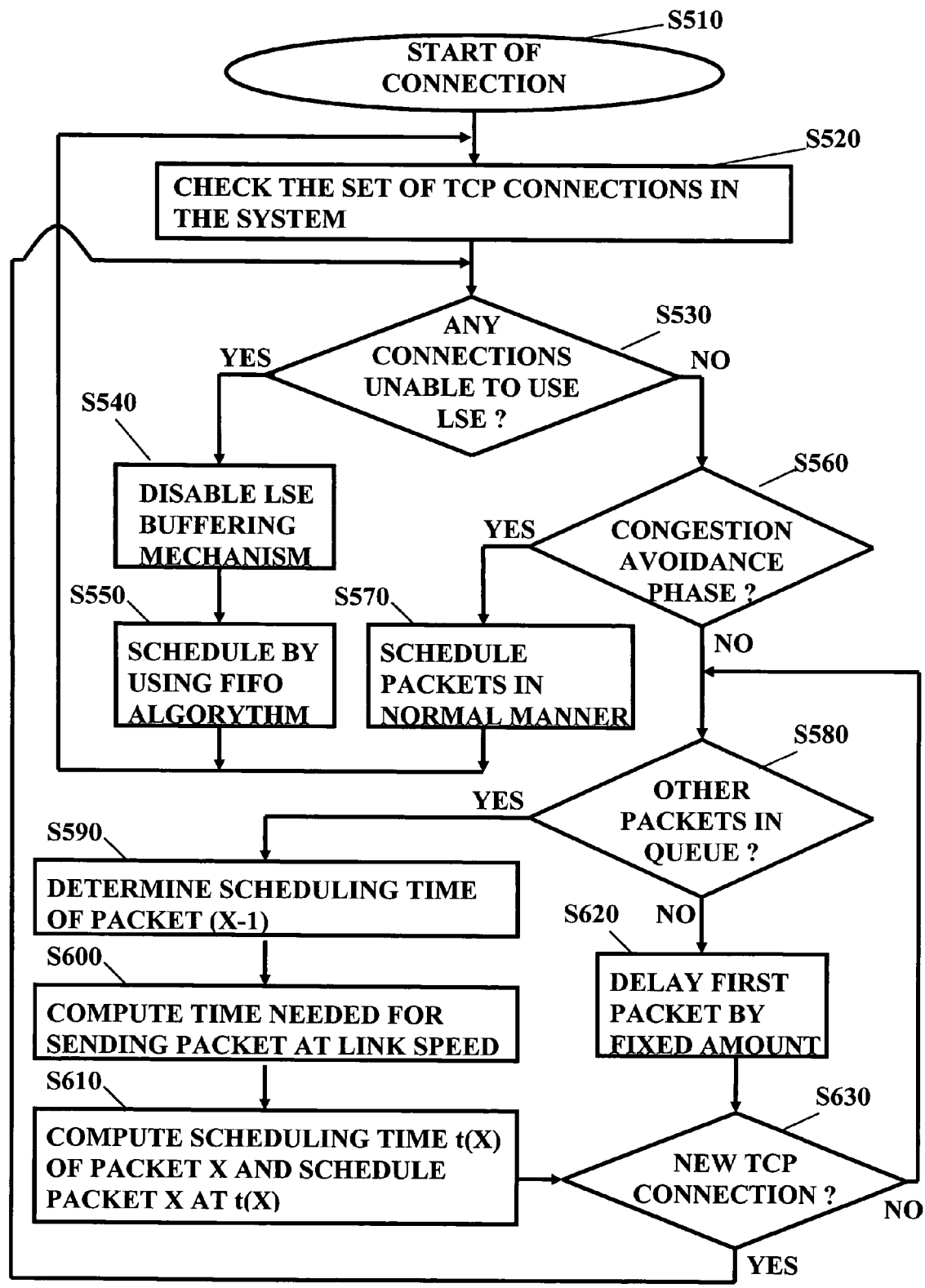
FIG. 9 shows a flow chart illustrating a scheduling mechanism according to one example of the second embodiment.

With reference to FIGS. 7 to 9, a first example of the second embodiment is described.

In FIG. 7, a signalling diagram between a TCP sender and a TCP receiver is shown for illustrating a start of a TCP connection. In FIG. 8, a diagram is shown illustrating a model of a scheduling mechanism applied in a TCP sender according to a first example of the second embodiment. In FIG. 9, a flow chart for illustrating the scheduling mechanism according to the first example of the second embodiment is shown.

Referring to FIG. 7, the start of a connection can be defined as the time when the TCP sender or receiver sends a respective SYN packet (step S510, FIG. 9). At the starting phase of the connection, according to the scheduling mechanism of the second embodiment, the TCP sender (or receiver) checks whether there are other connections (such as TCP connections) in the system, and if so, whether or not the set of the other TCP connections in the system comprises any connections (i.e. other TCP connections) that are communicating with a type of TCP sender/receiver which is not capable to execute the scheduling mechanism according to the second embodiment as described below (steps S520, S530 in FIG. 9). This checking may be achieved, for example, by using a signalling mechanism, such as UDP (User Datagram Protocol) applications which are running on the two end points (sender, receiver) of the connection. By means of such a signalling mechanism, information about the ability of performing the scheduling mechanism according to the second embodiment can be exchanged, for example by sending from one of the sender/receiver nodes to the other one a UDP packet comprising a corresponding information that all TCP connections use the same server, or by sending a request and by answering that request with a corresponding acknowledgement (ACK) message. In case the information or the ACK is not received, it is to be assumed that the corresponding answering node is not able to perform the proposed scheduling mechanism.

If the sender and/or receiver determine that there are other connections not using the scheduling mechanism according to the second embodiment, then the TCP sender must not enable the scheduling described below. In detail, the LSE buffering is disabled for both the sender and the receiver (step S540 in FIG. 9) and the packets are scheduled for the transmission by means of a default scheduling mechanism, such as one based on a FIFO algorithm (step S550 in FIG. 9).

It is to be noted that, if anytime during the connection (i.e. after the start of the connection for which a LSE buffering is determined to be possible according to step S530), the sender or receiver realizes that there are other TCP connections that are not using this scheduling mechanism, the scheduling mechanism is also to be disabled, preferably as soon as possible, for example, by sending a corresponding UDP packet to the server. This will be further defined in connection with step S630 of FIG. 9 described below.

One advantageous way to implement the feature of checking the ability of connections and disabling the LSE buffering is, for example, to require all TCP senders capable of using the LSE buffering to join a Multicast group. In such a case, for example a mobile (as one end-point of the connection) just sends the first UDP packet to this multicast group. By means of this it is not necessary that the end-point node, like the mobile, knows the exact IP address of the server or an involved Performance Enhancing Proxy (PEP). However, in such a case, it is to be noted that the PEP should only send a unicast response to the mobile.

Furthermore, in case the scheduling mechanism based on the LSE buffering is disabled in step S540, the usage of a FIFO based scheduling mechanism in step S550 is advantageous in that any packet reordering issue which might cause a TCP sender to trigger spurious retransmit (which in turn may degrade the performance) is prevented. On the other hand, packets that are already ahead of the queue might delay some the new packets.

On the other hand, when it is determined in step S530 that all connections use the LSE buffering based scheduling mechanism according to the second embodiment, step S560 in FIG. 9 is executed. In step S560, it is checked whether the sender node (TCP sender) is in a congestion avoidance phase. This can be discriminated, for example, by detecting whether a congestion window of the connection is smaller than SS_THRESH value.

If the determination in step S560 is YES, step S570 is executed in which a scheduling (i.e. of data and ACK packets) is performed in a normal manner, for example by using the FIFO based scheduling or a scheduling based on the first embodiment.

After both steps S550 and S570, the process returns to step S520.

If the determination in step S560 is NO, i.e. the TCP sender is not in a congestion avoidance phase, step S580 follows.

In step S580, for scheduling the packets of the connections, it is determined whether or not the current packet, i.e. the packet currently to be enqueued in a transmission queue of the TCP sender, is the first packet. In other words it is checked in step S580 whether or not there are other packets in the queue.

If the decision in step S580 is NO, i.e. there are no other packets in the queue, step S620 is executed in which the transmission of this first packet is delayed in the TCP sender by a fixed amount of time. Typically, the amount of time is in the order of 100 ms or the like. Then step S630 is executed which will be described below.

On the other hand, if the decision in step S580 is YES, i.e. there is at least one packet ahead of the current packet in the queue, steps S590 to S610 are executed. Generally, according to these steps S590 to S610, the current packet is scheduled at a time so that the entire queue ahead of it gets empty at the data rate of an emulation of the link speed (LSE) of the connection. This is also illustrated in FIG. 8. According to FIG. 8, a model for the LSE based scheduling at the TCP sender and how the queues are maintained is shown.

After the ACK from receiver is received (FIG. 8), the sender determines the scheduling time (or departure time) of a preceding packet (X−1) in the queue, which time is referred to also as T. This is executed in step S590. It is to be noted that the preceding packet (X−1) may also belong to a different TCP connection.

Then, in step S600, the time which is required for sending the preceding packet (X−1) at the link speed of the connection is computed in the sender.

In the following step S610 the scheduling time for the current packet X is computed on the basis of the scheduling time of the preceding packet (X−1), a packet size of the preceding packet (which is to be detected by the sender or can be derived from information contained in the preceding packet (not shown)) and a LSE-parameter to be set. In other words, a scheduling time for the packet X is calculated in the form $$t(X)=T+\text{pkt\_size }(X-1)/\text{LSE},$$

where pkt_size (X−1) is a value indicating the size of the preceding packet (X−1) and LSE is a value for the link speed emulation.

The value of LSE is, for example, the maximum link speed of the connection. Furthermore, the LSE value is derived from the estimated Round Trip Time (RTT) for the connection, wherein it is calculated by means of $$\text{LSE}=\text{congestion\_window}/\text{RTT},$$

where congestion_window is the TCP's window size for the connection whose packet is to be scheduled.

When the scheduling time t(X) is calculated, the sender schedules the packet X such that by the time the packet (X−1) reaches the receiver, the packet X is next to be sent. This is also shown in lower box in FIG. 8.

Preferably, TCP nodes using the scheduling mechanism described above are adapted to identify ACK packets and to send the identified ACK packets as soon as possible. However, the treatment (i.e. the transmission) of ACKs may be subject of specific protocol rules which is the case in TCP where a so-called delayed ACK rule is to be followed. Thus, such sending rules are only for scheduling, while the protocol logic is not to be changed.

When the scheduling time of the current packet is determined, either in step S610 or S620, step S630 follows in which it is checked whether any new connection is established at the sender and/or the receiver. If the decision in step S630 is NO, i.e. no new connections are detected, the process returns to step S580 in order to process remaining packets. On the other hand, when the decision in step S630 is YES, i.e. there is at least one new connection, the process returns to step S530 in order to check whether the new connection(s) is/are using the LSE buffering. This is to be performed in order to ensure that the LSE buffering is disabled when any of end nodes (sender/receiver) for the set of established connections is not able to perform the scheduling mechanism described above.

Next, a second example according to the second embodiment is described in connection with FIG. 10. The second example of the second embodiment is a modification of the first example. The differences of this second example to the first example are described in connection with the flow chart according to FIG. 10.

Figure 10:
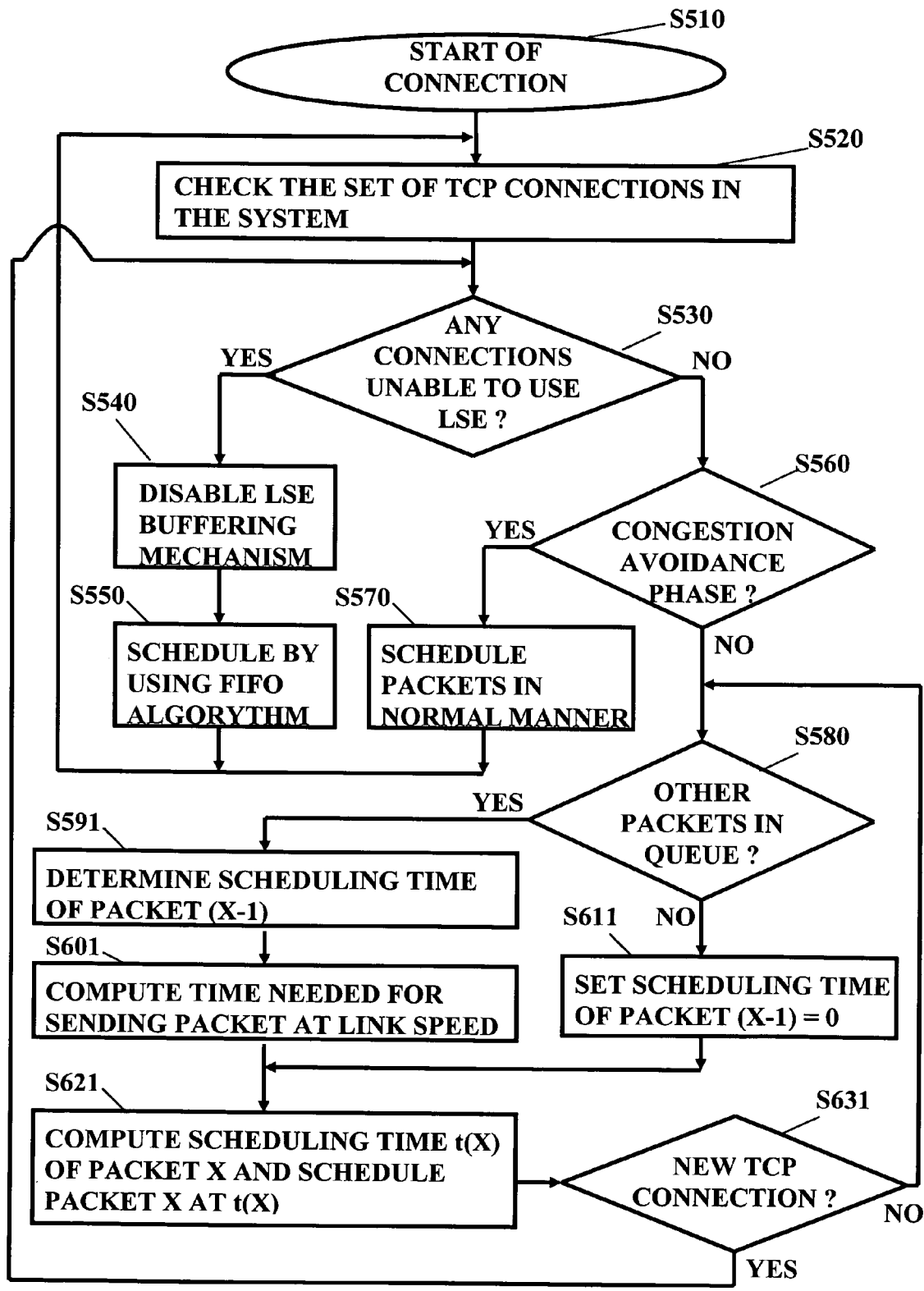
FIG. 10 shows a flow chart illustrating a scheduling mechanism according to another example of the second embodiment.

As shown in FIG. 10, steps S510 to S580 to be executed in the scheduling mechanism of the second embodiment are equivalent to those described in the first embodiment. Thus, for the sake of simplicity, a detailed description thereof is omitted.

After step S580, i.e. after the determination of whether or not there are any other packets in the queue, in case the decision in step S580 is NO, i.e. there are no other packets in the queue, step S611 is executed. In step S611, a "virtual" preceding packet (X−1) is assumed whose scheduling time is set to be zero. Then, step S621 is executed which will be described below.

On the other hand, if the decision in step S580 is YES, i.e. there is at least one packet ahead of the current packet in the queue, steps S591 and S601 are executed. Similarly to the first example, in step S591, the sender determines the scheduling time (or departure time) of a preceding packet (X−1) in the queue, which time is referred to also as T. It is to be noted that the preceding packet (X−1) may also belong to a different TCP connection.

Then, in step S601, the time which is required for sending the current packet X at the link speed of the connection is computed in the sender.

After step S601, the process proceeds to step S621 which is also executed, as mentioned above, after step S611. In step S621, the scheduling time for the current packet X is computed on the basis of the scheduling time of the preceding packet (X−1), a packet size of the current packet X (which is to be detected by the sender or can be derived from information contained in the current packet (not shown)) and a LSE-parameter to be set. In other words, a scheduling time for the packet X is calculated in the form $$t(X)=T+\text{pkt\_size }(X)/\text{LSE},$$

where pkt_size (X) is a value indicating the size of the current packet (X) and LSE is a value for the link speed emulation.

When the decision in step S580 is NO, the scheduling time of the (virtual) packet (X−1) is set to zero so that the calculation in step S621 is also valid for a first packet in the queue.

The value of LSE is, for example, the maximum link speed of the connection. Furthermore, the LSE value is derived from the estimated Round Trip Time (RTT) for the connection, wherein it is calculated by means of $$\text{LSE}=\text{congestion\_window}/\text{RTT},$$

where congestion_window is the TCP's window size for the connection whose packet is to be scheduled.

When the scheduling time t(X) is calculated, the sender schedules the packet X accordingly in the queue.

After the scheduling of the packet in step S621, step S631 is executed. Similarly to step S630 of FIG. 9, it is checked whether any new connection is established at the sender and/or the receiver. If the decision in step S631 is NO, i.e. no new connections are detected, the process returns to step S580 in order to process remaining packets. On the other hand, when the decision in step S631 is YES, i.e. there is at least one new connection, the process returns to step S530 in order to check whether the new connection(s) is/are using the LSE buffering. This is to be performed in order to ensure that the LSE buffering is disabled when any of end nodes (sender/receiver) for the set of established connections is not able to perform the scheduling mechanism described above.

In this second example, the TCP sender emulates the bottleneck router more closely than the scheme described in the first example of the second embodiment.

In both of the first and second examples of the second embodiment, by setting the value of the link speed used for the LSE parameter at a suitable value, it is possible to prevent an end-to-end delay being deteriorated in comparison with a case without using the LSE buffering. In other words, it is achievable that the amount of (delay at server caused by LSE buffering+buffering delay at bottleneck (e.g. SGSN)) is not worse than (buffering delay at bottleneck) in the conventional case without LSE buffering. This is achievable, for example, if the used value for the link speed is set to the upper bound of the actual link speed.

Furthermore, a penalizing traffic from the server where LSE buffering is implemented compared to traffic from other servers where LSE buffering is not implemented can be prevented by using an explicit signalling from the TCP receiver to the sender to disable the LSE buffering if there is traffic from other non-LSE buffering sources.

The second embodiment is in particular advantageous in that there is no need for changes in the network infrastructure. Thus, the scheduling mechanism according to the second embodiment is generally applicable in all existing packet based networks as long as the sender and receiver nodes are able to implement this scheduling scheme using LSE buffering. Furthermore, this scheduling mechanism allows a TCP server to speed up the throughput in congestion avoidance. Moreover, this scheduling mechanism also speeds up the slow start as compared to other connections. The latter one is achievable by delaying all packets by the LSE mechanism described in the second embodiment and then prioritizing the "smaller buffers" (e.g. by the scheme described in the first embodiment), or by delaying all packets (connections) excluding the slow starting connections which are not delayed (which means that they are prioritized over the other connections).

Even though the examples of the scheduling mechanisms according to the first and second embodiments are described in connection with TCP, it is also possible to combine each of them with other types of transport protocols. Moreover, the limits for the parameters used in the scheduling mechanisms can be varied so as to adopt the mechanisms to a specific network application.

As described above, an improved scheduling mechanism usable for a data transmission in a packet based network is provided. A plurality of connections is detected, and for each of the connections, a buffer occupancy level is determined. Then, the connections having a smaller buffer occupancy level are prioritized in comparison to the other connections, and packets of the plurality of connections are scheduled on the basis of the result of the prioritizing. The scheduling mechanism is implemented in a network element of the packet based network or in a sender and receiver.

It should be understood that the above description and accompanying figures are merely intended to illustrate the present invention by way of example only. The described embodiments of the present invention may thus vary within the scope of the attached claims.

It should be understood that the above description and accompanying figures are merely intended to illustrate the present invention by way of example only. The described embodiments of the present invention may thus vary within the scope of the attached claims.

The invention claimed is:

1. A method, comprising:
receiving an indication that a plurality of connections have been detected;
determining a buffer occupancy level for each of the plurality of connections;
prioritizing the connections comprising a smaller buffer occupancy level in comparison to the other connections;
scheduling packets of the plurality of connections based on a result of the prioritizing; and
allocating a priority indication to each of the plurality of connections based on the determined buffer occupancy level,
wherein the determining the buffer occupancy level comprises
computing the buffer occupancy level of a respective connection based on an equation:

$$\text{occupancy}(i) = \frac{\text{bytes\_enqueued\_for\_}(i)}{\sum_{j=1}^{N} \text{bytes\_enqueued\_for\_}(j)};$$

wherein i indicates the respective connection, occupancy(i) indicates the buffer occupancy level of the respective connection, bytes_enqueued_for indicates the number of bytes of a respective connection enqueued in the buffer, and N indicates the total number of the plurality of connections,
wherein the allocating the priority indication comprises assigning a probability value which defines a transmission probability of a packet of the respective connection to each of the plurality of connections on the basis of the buffer occupancy level on the basis of an equation $$\text{occupancy}(i) < \frac{1}{N} - \delta;$$

wherein i indicates the respective connection, sched_priority(i) indicates the probability value which defines a transmission probability of a packet of the respective connection, occupancy(i) indicates the buffer occupancy level of the respective connection, and N indicates the total number of the plurality of connections.

2. The method according to claim 1, further comprising:
identifying a packet transmitted on a connection of a specific type.

3. The method according to claim 1, wherein the determining the buffer occupancy level comprises determining the buffer occupancy level in a buffer of a network element.

4. The method according to claim 1, wherein the allocating the priority indication comprises allocating a high priority level to a connection comprising a smaller buffer occupancy level than the other connections.

5. The method according to claim 4, further comprising:
comparing the determined buffer occupancy level of each of the plurality of connections with a predetermined parameter for deciding on a kind of allocation of the priority indication.

6. The method according to claim 5, wherein the comparing the determined buffer occupancy level of each of the plurality of connections with the predetermined parameter is based on a relation:

$$\text{occupancy}(i) < \frac{1}{N} - \delta;$$

wherein i indicates the respective connection, occupancy (i) indicates the buffer occupancy level of the respective connection, N indicates the total number of the plurality of connections, and δ indicates a configurable parameter, and
wherein $$0 < \delta < \frac{1}{N}.$$

7. The method according to claim 1, further comprising:
updating the priority indication allocated to each of the plurality of connections when a new packet is received via at least one of the plurality of connections.

8. The method according to claim 1, wherein the processing the priority indications of each of the plurality of connections comprises ordering the connections in a ranking according to the probability values of each of the plurality of connections.

9. The method according to claim 8, wherein the scheduling the data packets of each of the plurality of connections comprises:
generating a random number;
selecting a connection of the plurality of connections based on a comparison between the rankings of each of the plurality of connections and the random number; and
scheduling a packet of the selected connection for transmitting it.

10. The method according to claim 9, wherein the selecting the connection comprises selecting a connection whose ranking is greater than the random number and closest to the random number.

11. The method according to claim 9, wherein the scheduling of the data packets is repeated.

12. The method according to claim 1, further comprising:
executing the method for a slow start condition of at least one of the plurality of connections.

13. The method according to claim 1, wherein the plurality of connections comprise at least one connection of a transmission control protocol type.

14. A method comprising:
receiving an indication that a plurality of connections have been detected, wherein at least one of the plurality of connections has a slow start condition;
determining a buffer occupancy level for each of the plurality of connections;
prioritizing the connections comprising a smaller buffer occupancy level in comparison to the other connections;
scheduling packets of the plurality of connections based on a result of the prioritizing; and
allocating a priority indication to each of the plurality of connections based on the determined buffer occupancy level,
wherein the determining of the buffer occupancy level comprises
computing the buffer occupancy of a respective connection by summing up a total data amount of all packets present for a respective connection;
comparing the total data amount of the respective connection with unique predetermined threshold values defined for a plurality of queues of the buffer based on a relation $$bth(q) \leq B < bth(q+1);$$

wherein B indicates the total data amount of the respective connection, q indicates a respective queue of the plurality of queues, and bth indicates the unique predetermined data amount threshold value for a queue; and
assigning the respective connection to one of the queues based on the comparing of the total data amount of the respective connection with the unique predetermined threshold values,
wherein each of the queues is associated with a unique priority level.

15. The method according to claim 14, wherein the assigning the respective connection to one of the queues comprises assigning the respective connection to the queue whose unique predetermined data amount threshold value is smaller or equal than the total data amount of the respective connection.

16. The method according to claim 14, wherein the allocating the priority indication to each of the plurality of connections comprises assigning the priority value of the queue to which the respective connection as the priority indication of the respective connection.

17. The method according to claim 16, wherein the processing the priority indications of each of the plurality of connections comprises ordering the connections in a ranking according to the priority value of the queues.

18. The method according to claim 17, wherein the scheduling the packets comprises:
selecting the connection comprising the highest priority indication; and
scheduling a packet of the selected connection for transmitting it.

19. The method according to claim 16, wherein in a case where two or more of the plurality of connections are allocated to the same priority indication, the scheduling the packets is based on a heuristic algorithm for at least the two or more of the plurality of connections.

20. The method according to claim 14, wherein the connections comprise at least one connection of a transmission control protocol type.

21. A method, comprising:
receiving an indication that a plurality of connections arriving at one network node have been detected;
determining, in the one network node, a buffer occupancy level for each of the plurality of connections;
prioritizing, in the one network node, the connections comprising a smaller buffer occupancy level in comparison to the other connections;
scheduling, in the one network node, packets of the plurality of connections based on a result of the prioritizing,
wherein the prioritizing the connections comprises providing for emulation of a link speed for each of the plurality of connections,
wherein the scheduling of the packets is based on the link speed emulation, and
determining, in the one network node, whether or not a current packet to be enqueued is the first packet in a queue of a respective connection,
wherein when a result from the determining is NO, the method further comprises:
determining, in the one network node, a scheduling time for the transmission of a preceding packet; and
computing, in the one network node, a scheduling time for the current packet on the basis of the scheduling time of the preceding packet, a packet size of the preceding packet and the link speed emulation parameter, wherein the scheduling of the packet is based on the scheduling time for the current packet.

22. The method according to claim 21, further comprising: determining a link speed emulation parameter based on a maximum link speed of a respective connection.

23. The method according to claim 21, further comprising determining a link speed emulation parameter based on a round trip time for a respective connection.

24. The method according to claim 21, wherein when a result from the determining is YES, the method further comprises delaying a transmission time of the first packet by a fixed amount of time.

25. The method according to claim 21, wherein when a result from the determining is YES, the method further comprises:
setting a scheduling time for a transmission of a virtual preceding packet at zero; and
computing a scheduling time for the current packet on the basis of the set scheduling time of the virtual preceding packet, a packet size of the current packet and the link speed emulation parameter, wherein the scheduling of the packet is based on the scheduling time for the current packet.

26. The method according to claims 21, further comprising:
checking whether a sender node is in a congestion avoidance phase, and if the sender node is in the congestion avoidance phase; and
disabling the emulating a link speed for each of the plurality of connections,
wherein the scheduling packets is based on a default scheduling mechanism.

27. The method according to claim 21, wherein the receiving the indication that the plurality of connection have been detected detecting further comprises:
checking whether or not any one of the plurality of connections comprises a sender node and/or a receiver node being not capable of performing emulating a link speed for each of the plurality of connections, and if there is one sender node and/or receiver node not being capable of performing emulating a link speed for each of the plurality of connections; and
disabling the emulating a link speed for each of the plurality of connections for all sender nodes and receiver nodes,
wherein the scheduling packets is based on a default scheduling mechanism.

28. An apparatus comprising at least one processor and at least one memory including computer program code, the at least one memory and the computer program code configured to, with the at least one processor, cause the apparatus at least to:
receive an indication that a plurality of connections have been detected;
determine a buffer occupancy level of each of the plurality of connections;
prioritize the connections comprising a smaller buffer occupancy level in comparison to the other connections;
schedule packets of the plurality of connections on the basis of the result obtained by prioritizing the connections; and
allocate a priority indication to each of the plurality of connections based on the determined buffer occupancy level,
wherein being caused to determine the buffer occupancy level includes being caused to compute the buffer occupancy based on an equation:

$$\mathrm{occupancy}(i) = \frac{\mathrm{bytes\_enqueued\_for\_}(i)}{\sum_{j=1}^{N} \mathrm{bytes\_enqueued\_for\_}(j)};$$

wherein i indicates the respective connection, occupancy (i) indicates the buffer occupancy level of the respective connection, bytes_enqueued_for indicates the number of bytes of a respective connection enqueued in the buffer, and N indicates the total number of the plurality of connection,
wherein being caused to allocate the priority indication includes being caused to assign a probability value which defines a transmission probability of a packet of the respective connection to each of the plurality of connections on the basis of the buffer occupancy level on the basis of an equation $$\mathrm{sched\_priority}(i) = \frac{1 - \mathrm{occupancy}(i)}{N - 1};$$

wherein i indicates the respective connection, sched_priority(i) indicates the probability value which defines a transmission probability of a packet of the respective connection, occupancy(i) indicates the buffer occupancy level of the respective connection, and N indicates the total number of the plurality of connections.

29. The apparatus according to claim 28, wherein the apparatus is further caused to identify a packet transmitted on a connection of a specific type.

30. The apparatus according to claim 28, wherein being caused to determine the buffere occupancy includes being caused to determine the buffer occupancy level in a buffer of a network element.

31. The apparatus according to claim 30, wherein being caused to allocate the priority indication includes being caused to allocate a higher priority level to a connection having a smaller buffer occupancy level than the other connections.

32. The apparatus according to claim 30, wherein the apparatus is further caused to update the priority indication allocated to each of the plurality of connections when a new packet is received via at least one of the plurality of connections.

33. The apparatus according to claim 30, wherein being caused to determine the buffer occupancy level included being caused to determine the buffer occupancy level by computing the buffer occupancy of a respective connection by comparing the number of bytes of one of the plurality of connections with the number of bytes of all of the plurality of connections.

34. The apparatus according to 30, wherein the apparatus is further caused to compare the determined buffer occupancy level of each of the plurality of connections with a predetermined parameter; and decide a kind of the allocation of the priority indication based on the comparison.

35. The apparatus according to claim 34, wherein being caused to compare the determined buffer occupancy level includes being caused to check a relation $$\text{occupancy}(i) < \frac{1}{N} - \delta;$$

wherein i indicates the respective connection, occupancy (i) indicates the buffer occupancy level of the respective connection, N indicates the total number of the plurality of connections, and δ indicates a configurable parameter, and
wherein $$0 < \delta < \frac{1}{N}.$$

36. The apparatus according to claim 28, wherein the apparatus is further caused to process the priority indications of each of the plurality of connections and order the connections in a ranking according to the probability values of each of the plurality of connections.

37. The apparatus according to claim 28, wherein the apparatus is further caused to:
generate a random number;
select the connection of the plurality of connections on basis of a comparison between the rankings of each of the plurality of connections and the random number; and
schedule a data packet of the selected connection for a transmission.

38. The apparatus according to claim 37, wherein in the selection of the connection, the apparatus is further caused to select a connection whose ranking is greater than the random number and closest to the random number.

39. The apparatus according to claim 37, wherein the apparatus is further caused to repeat the scheduling of the data packets.

40. The apparatus according to claim 28, wherein the apparatus is configured to be used for a slow start condition of at least one of the plurality of connections.

41. The method according to claim 28, wherein the plurality of connections comprise at least one connection of a transmission control protocol type.

42. An apparatus comprising at least one processor and at least one memory including computer program code, the at least oen memory and the computer program code configured to, with the at least one processor, cause the apparatus at least to:
receive an indication that a plurality of connections have been detected, determining that at least one of the plurality of connections has a slow start condition;
determine a buffer occupancy level of each of the plurality of connections;
prioritize the connections comprising a smaller buffer occupancy level in comparison to the other connections;
schedule packets of the plurality of connections on the basis of the result obtained by prioritizing the connections; and
allocate a priority indication to each of the plurality of connections based on the determined buffer occupancy level,
wherein the being caused to determine the buffer occupancy level includes being caused to
compute the buffer occupancy of a respective connection by summing up a total data amount of all packets present for a respective connection;
compare the total data amount of the respective connection with unique predetermined threshold values defined for a plurality of queues of the buffer on the basis of a relation $$bth(q) \leq B < bth(q+1);$$

wherein B indicates the total data amount of the respective connection, q indicates a respective queue of the plurality of queues, and bth indicates the unique predetermined data amount threshold value for a queue; and
assign the respective connection to one of the queues based on the comparing of the total data amount of the respective connection with the unique predetermined threshold values, wherein each of the queues is associated with a unique priority level.

43. The apparatus according to claim 42, wherein being caused to determine the buffer occupancy level includes being caused to assign the respective connection to a queue with a unique predetermined data amount threshold value that is smaller than or equal to the total data amount of the respective connection.

44. The apparatus according to claim 42, wherein being caused to allocate the priority indication includes being caused to allocate the priority value of the queue to which the respective connection is assigned as the priority indication of the respective connection.

45. The apparatus according to claim 44, wherein the apparatus is further caused to order the connections in a ranking according to the priority value of the queues.

46. The apparatus according to claim 45, wherein being caused to schedule the packets includes being caused to:
select the connection comprising the highest priority indication; and
schedule a data packet of the selected connection for a transmission.

47. The apparatus according to claim 44, wherein in a case where two or more of the plurality of connections are allocated to the same priority indication, being caused to schedule the packets includes being caused to schedule the packets on the basis of a heuristic algorithm for at least the two or more of the plurality of connections.

48. The apparatus according to claim 42, wherein the connections comprise at least one connection of a transmission control protocol type.

49. An apparatus comprising at least one processor and at least one memory including computer program code, the at least one memory and the computer program code configured to, with the at least one processor, cause the apparatus at least to:
receive an indication that a plurality of connections arriving at one network node have been detected;
determine, in the one network node, a buffer occupancy level of each of the plurality of connections;
prioritize, in the one network node, the connections comprising a smaller buffer occupancy level in comparison to the other connections;
schedule, in the one network node, packets of the plurality of connections on the basis of the result obtained by prioritizing the connections,
wherein being caused to prioritize the connections includes being caused to provide for emulation of a link speed for each of the plurality of connections, and
wherein being caused to schedule the packets includes being caused to schedule the packets on the basis of the link speed emulation, and wherein being caused to determine the buffer occupancy level includes being caused to determine whether or not a current packet is the first packet in a queue of a respective connection, wherein when a result from the determination is NO, the apparatus is caused to determine a scheduling time for the transmission of a preceding packet; and wherein the apparatus is further caused to compute, in the one network node, a scheduling time for the current packet on the basis of the scheduling time of the preceding packet, a packet size of the preceding packet and the link speed emulation parameter, wherein the scheduling of the packet is based on the scheduling time for the current packet.

50. The apparatus according to claim 49, wherein the apparatus is further caused to determiner configured to determine a link speed emulation parameter based on a maximum link speed of a respective connection.

51. The apparatus according to claim 49, wherein the apparatus is further caused to determine a link speed emulation parameter based on a round trip time for a respective connection.

52. The apparatus according to claim 49, wherein the apparatus is further caused to, in response to determining that the current packet is the first packet in a queue of a respective connection, delay a transmission time of the first packet by a fixed amount of time.

53. The apparatus according to claim 49, wherein the apparatus is further caused to determine a scheduling time for the transmission of a preceding packet; and wherein, in response to determining that the current packet is not the first packet in a queue of a respective connection, the apparatus is caused to determine a scheduling time for the transmission of the preceding packet, and compute a scheduling time for the current packet on the basis of the scheduling time of the preceding packet, a packet size of the current packet and the link speed emulation parameter, and wherein the apparatus is caused to schedule the packet based on the scheduling time for the current packet.

54. The apparatus according to claim 49, wherein the apparatus is further caused to:

set a scheduling time for a transmission of a virtual preceding packet at zero;

wherein, in response to determining that the current packet is the first packet in a queue of a respective connection, the apparatus is caused to set the scheduling time for a transmission of a virtual preceding packet at zero, and wherein the apparatus is caused to compute a scheduling time for the current packet on the basis of the set scheduling time of the virtual preceding packet, a packet size of the current packet and the link speed emulation parameter, and wherein the apparatus is caused to schedule the packet based on the scheduling time for the current packet.

55. The apparatus according to claim 49, wherein the apparatus is further caused to:

check whether a sender node is in a congestion avoidance phase; and disable the emulation of the link speed for each of the plurality of connections, wherein, in response to the sender node being in the congestion avoidance phase, the apparatus is caused to disable the emulation and schedule the packets based on a default scheduling mechanism.

56. The apparatus according to claim 49, wherein the apparatus is further caused to:

check whether or not any one of the plurality of connections comprises a sender node and/or a receiver node being not capable of performing emulating a link speed for each of the plurality of connections; and disable the emulation of a link speed for each of the plurality of connections for all sender nodes and receiver nodes, wherein, in response to determining that there is one sender node and/or receiver node not being capable of performing the emulation of a link speed for each of the plurality of connections, the apparatus is caused to disable the emulation of the link speed for each of the plurality of connections for all sender nodes and receiver nodes, and schedule the packets based on a default scheduling mechanism.

57. A computer readable storage medium encoded with instructions that, when executed by a computer, perform a process comprising:

receiving an indication that a plurality of connections have been detected;

determining a buffer occupancy level for each of the plurality of connections;

prioritizing the connections having a smaller buffer occupancy level in comparison to the other connections;

scheduling packets of the plurality of connections on the basis of the result of the prioritizing; and allocating a priority indication to each of the plurality of connections based on the determined buffer occupancy level, wherein the determining the buffer occupancy level comprises computing the buffer occupancy level of a respective connection based on an equation:

$$\text{occupancy}(i) = \frac{\text{bytes\_enqueued\_for\_}(i)}{\sum_{j=1}^{N} \text{bytes\_enqueued\_for\_}(j)};$$

wherein i indicates the respective connection, occupancy(i) indicates the buffer occupancy level of the respective connection, bytes_enqueued_for indicates the number of bytes of a respective connection enqueued in the buffer, and N indicates the total number of the plurality of connections, wherein the allocating the priority indication comprises assigning a probability value which defines a transmission probability of a packet of the respective connection to each of the plurality of connections on the basis of the buffer occupancy level on the basis of an equation $$\text{sched\_priority}(i) = \frac{1 - \text{occupancy}(i)}{N - 1};$$

wherein i indicates the respective connection, sched_priority(i) indicates the probability value which defines a transmission probability of a packet of the respective connection, occupancy(i) indicates the buffer occupancy level of the respective connection, and N indicates the total number of the plurality of connections.

58. A computer readable storage medium encoded with instructions that, when executed by a computer, perform a process comprising:
- receiving an indication that a plurality of connections have been detected, wherein at least one of the plurality of connections has a slow start condition;
- determining a buffer occupancy level for each of the plurality of connections;
- prioritizing the connections comprising a smaller buffer occupancy level in comparison to the other connections;
- scheduling packets of the plurality of connections based on a result of the prioritizing; and
- allocating a priority indication to each of the plurality of connections based on the determined buffer occupancy level,
- wherein the determining of the buffer occupancy level comprises
    - computing the buffer occupancy of a respective connection by summing up a total data amount of all packets present for a respective connection;
    - comparing the total data amount of the respective connection with unique predetermined threshold values defined for a plurality of queues of the buffer on the basis of a relation $bth(q) \leq B < bth(q+1)$;

- wherein B indicates the total data amount of the respective connection, q indicates a respective queue of the plurality of queues, and bth indicates the unique predetermined data amount threshold value for a queue; and
    - assigning the respective connection to one of the queues based on the comparing of the total data amount of the respective connection with the unique predetermined threshold values,
    - wherein each of the queues is associated with a unique priority level.

59. A computer readable storage medium encoded with instructions that, when executed by a computer, perform a process comprising:
- receiving an indication that a plurality of connections arriving at one network node have been detected;
- determining, in the one network node, a buffer occupancy level for each of the plurality of connections;
- prioritizing, in the one network node, the connections comprising a smaller buffer occupancy level in comparison to the other connections;
- scheduling, in the one network node, packets of the plurality of connections based on a result of the prioritizing,
- wherein the prioritizing the connections comprises providing for emulation of a link speed for each of the plurality of connections,
- wherein the scheduling of the packets is based on the link speed emulation, and
- determining, in the one network node, whether or not a current packet is the first packet in a queue of a respective connection,
- wherein when a result from the determining is NO, the method further comprises:
    - determining, in the one network node, a scheduling time for the transmission of a preceding packet; and
    - computing, in the one network node, a scheduling time for the current packet on the basis of the scheduling time of the preceding packet, a packet size of the preceding packet and the link speed emulation parameter, wherein the scheduling of the packet is based on the scheduling time for the current packet.

60. An apparatus, comprising:
- means for receiving an indication that a plurality of connections have been detected;
- determining means for determining a buffer occupancy level of each of the plurality of connections;
- prioritizing means for prioritizing the connections comprising a smaller buffer occupancy level in comparison to the other connections;
- scheduling means for scheduling packets of the plurality of connections on the basis of the result obtained by the prioritizing means; and
- allocating means for allocating a priority indication to each of the plurality of connections based on the determined buffer occupancy level,
- wherein the determining means is further for computing the buffer occupancy based on an equation:

$$\text{occupancy}(i) = \frac{\text{bytes\_enqueued\_for\_}(i)}{\sum_{j=1}^{N} \text{bytes\_enqueued\_for\_}(j)};$$

- wherein i indicates the respective connection, occupancy(i) indicates the buffer occupancy level of the respective connection, bytes_enqueued_for indicates the number of bytes of a respective connection enqueued in the buffer, and N indicates the total number of the plurality of connection,
- wherein the allocating means is for assigning a probability value which defines a transmission probability of a packet of the respective connection to each of the plurality of connections on the basis of the buffer occupancy level on the basis of an equation $$\text{sched\_priority}(i) = \frac{1 - \text{occupancy}(i)}{N - 1};$$

- wherein i indicates the respective connection, sched_priority(i) indicates the probability value which defines a transmission probability of a packet of the respective connection, occupancy(i) indicates the buffer occupancy level of the respective connection, and N indicates the total number of the plurality of connections.

61. An apparatus, comprising:
- means for receiving an indication that a plurality of connections have been detected;
- determining that at least one of the plurality of connections has a slow start condition;
- determining means for determining a buffer occupancy level of each of the plurality of connections;
- prioritizing means for prioritizing the connections comprising a smaller buffer occupancy level in comparison to the other connections;
- scheduling means for scheduling packets of the plurality of connections on the basis of the result obtained by the prioritizing means; and
- allocating means for allocating a priority indication to each of the plurality of connections based on the determined buffer occupancy level,
- wherein the determining means is further for
    - computing the buffer occupancy of a respective connection by summing up a total data amount of all packets present for a respective connection;

comparing the total data amount of the respective connection with unique predetermined threshold values defined for a plurality of queues of the buffer on the basis of a relation $$bth(q) \leq B < bth(q+1);$$

wherein B indicates the total data amount of the respective connection, q indicates a respective queue of the plurality of queues, and bth indicates the unique predetermined data amount threshold value for a queue; and assigning the respective connection to one of the queues on based on the comparing of the total data amount of the respective connection with the unique predetermined threshold values, wherein each of the queues is associated with a unique priority level.

62. An apparatus, comprising:

means for receiving an indication that a plurality of connections arriving at one network node have been detected;

determining means for determining, in the one network node, a buffer occupancy level of each of the plurality of connections;

prioritizing means for prioritizing, in the one network node, the connections comprising a smaller buffer occupancy level in comparison to the other connections;

scheduling means for scheduling, in the one network node, packets of the plurality of connections on the basis of the result obtained by the prioritizing means, wherein the prioritizing the connections comprises providing for emulation of a link speed for each of the plurality of connections, wherein the scheduling of the packets is based on the link speed emulation, and the determining means is for determining whether or not a current packet is the first packet in a queue of a respective connection, wherein when a result from the determining is NO, the determining means is determining a scheduling time for the transmission of a preceding packet; and a computing means is for computing, in the one network node, a scheduling time for the current packet on the basis of the scheduling time of the preceding packet, a packet size of the preceding packet and the link speed emulation parameter, wherein the scheduling of the packet is based on the scheduling time for the current packet.

63. A system, comprising:

at least one network node configured to control a packet data transmission, wherein the network node comprises at least one processor and at least one memory including computer program code, the at least one memory and the computer program code configured to, with the at least one processor, cause the network node at least to;

receiving an indication that a plurality of connections have been detected;

determine a buffer occupancy level of each of the plurality of connections;

prioritize the connections comprising a smaller buffer occupancy level in comparison to the other connections;

schedule packets of the plurality of connections on the basis of the result obtained by prioritizing the connections; and allocate a priority indication to each of the plurality of connections based on the determined buffer occupancy level, wherein being caused to determining the buffer occupancy level includes being caused to compute the buffer occupancy based on an equation:

$$occupancy(i) = \frac{\text{bytes\_enqueued\_for\_}(i)}{\sum_{j=1}^{N} \text{bytes\_enqueued\_for\_}(j)};$$

wherein i indicates the respective connection, occupancy(i) indicates the buffer occupancy level of the respective connection, bytes_enqueued_for indicates the number of bytes of a respective connection enqueued in the buffer, and N indicates the total number of the plurality of connections, wherein being caused to allocate the priority indication includes being caused to assign a probability value which defines a transmission probability of a packet of the respective connection to each of the plurality of connections on the basis of the buffer occupancy level on the basis of an equation $$\text{sched\_priority}(i) = \frac{1 - occupancy(i)}{N - 1};$$

wherein i indicates the respective connection, sched_priority(i) indicates the probability value which defines a transmission probability of a packet of the respective connection, occupancy(i) indicates the buffer occupancy level of the respective connection, and N indicates the total number of the plurality of connections.

64. The system according to claim 63, wherein the network node is a router.

65. The system according to claim 63, wherein the network node is a serving support node of a packet based radio service.

66. A system, comprising:

at least one network node configured to control a packet data transmission, wherein the network node comprises at least one processor and at least one memory including computer program code, the at least one memory and the computer program code configured to, with the at least one processor, cause the network node at least to:

receiving an indication that a plurality of connections have been detected;

determine that at least one of the plurality of connections has a slow start condition;

determine a buffer occupancy level of each of the plurality of connections, prioritize the connections comprising a smaller buffer occupancy level in comparison to the other connections, schedule packets of the plurality of connections on the basis of the result obtained by prioritizing the connections, and allocate a priority indication to each of the plurality of connections based on the determined buffer occupancy level, wherein being caused to determine the buffer occupancy level includes being caused to compute the buffer occupancy of a respective connection by summing up a total data amount of all packets present for a respective connection, compare the total data amount of the respective connection with unique predetermined threshold values defined for a plurality of queues of the buffer on the basis of a relation $$bth(q) \leq B < bth(q+1);$$

wherein B indicates the total data amount of the respective connection, q indicates a respective queue of the plurality of queues, and bth indicates the unique predetermined data amount threshold value for a queue, and assign the respective connection to one of the queues based on the comparing of the total data amount of the respective connection with the unique predetermined threshold values, wherein each of the queues is associated with a unique priority level.

67. The system according to claim 66, wherein the network node is a router.

68. The system according to claim 66, wherein the network node is a serving support node of a packet based radio service.

69. A system, comprising:

at least one network node configured to control packet data transmission, wherein the network node comprises at least one processor and at least one memory including computer program code, the at least one memory and the computer program code configured to, with the at least one processor, cause the network node at least to:

receive an indication that a plurality of connections arriving at one network node have been detected, determine, in the one network node, a buffer occupancy level of each of the plurality of connections, prioritize, in the one network node, the connections comprising a smaller buffer occupancy level in comparison to the other connections, schedule, in the one network node, packets of the plurality of connections on the basis of the result obtained by prioritizing the connections, wherein being caused to prioritize the connections includes being caused provide for emulation of a link speed for each of the plurality of connections, wherein being caused to schedule the packets includes being caused to schedule the packets on the basis of the link speed emulation, and wherein being caused to determine the occupancy level includes being caused to determine whether or not a current packet is the first packet in a queue of a respective connection, wherein, when a result from the determining is NO, the network is caused to determine a scheduling time for the transmission of a preceding packet; and compute a scheduling time for the current packet on the basis of the scheduling time of the preceding packet, a packet size of the preceding packet and the link speed emulation parameter, wherein the scheduling of the packet is based on the scheduling time for the current packet.

70. The system according to claim 69, wherein the network node is a router.

71. The system according to claim 69, wherein the network node is a serving support node of a packet based radio service.

72. A method, comprising:

receiving an indication that a plurality of connections arriving at one network node have been detected;

determining, in the one network node, a buffer occupancy level for each of the plurality of connections;

prioritizing, in the one network node, the connections comprising a smaller buffer occupancy level in comparison to the other connections;

scheduling, in the one network node, packets of the plurality of connections based on a result of the prioritizing, wherein the prioritizing the connections comprises providing for emulation of emulating a link speed for each of the plurality of connections, wherein the scheduling of the packets is based on the link speed emulation, and determining, in the one network node, whether or not a current packet is the first packet in a queue of a respective connection, wherein when a result from the determining is NO, the method further comprises:

determining, in the one network node, a scheduling time for the transmission of a preceding packet; and computing, in the one network node, a scheduling time for the current packet on the basis of the scheduling time of the preceding packet, a packet size of the current packet and the link speed emulation parameter, wherein the scheduling of the packet is based on the scheduling time for the current packet.

* * * * *

UNITED STATES PATENT AND TRADEMARK OFFICE
CERTIFICATE OF CORRECTION

PATENT NO. : 7,724,750 B2
APPLICATION NO. : 10/866998
DATED : May 25, 2010
INVENTOR(S) : Swami et al.

It is certified that error appears in the above-identified patent and that said Letters Patent is hereby corrected as shown below:

Column 20,
Lines 27-32, the equation should be deleted and replaced with the following:

$$\text{sched\_priority}(i) = \frac{1 - \text{occupancy}(i)}{N - 1};$$

Column 23,
Line 34, cancel "detecting".

Column 24,
Line 13, "connection" should read --connections--;
Line 38, "buffere" should read --buffer--.

Column 25,
Line 23, "claim 28" should read --claim 36--;
Line 46, "oen" should read --one--.

Column 27,
Line 16, cancel "to determiner configured".

Column 30,
Line 29, "connection" should read --connections--.

Column 32,
Line 4, "determing" should read --determine--.

Column 33,
Line 43, "caused provide" should read --caused to provide--.

Signed and Sealed this
Eleventh Day of October, 2011

David J. Kappos
*Director of the United States Patent and Trademark Office*

Column 34,
Line 6, "network is" should read --network node is--.